United States Patent
Lewis et al.

(10) Patent No.: US 9,435,668 B2
(45) Date of Patent: Sep. 6, 2016

(54) FIBRE OPTIC DISTRIBUTED SENSING

(75) Inventors: Andrew Biggerstaff Lewis, Bristol (GB); Stuart John Russell, Bristol (GB)

(73) Assignee: OPTASENSE HOLDINGS LTD. (GB)

( * ) Notice: Subject to any disclaimer, the term of this patent is extended or adjusted under 35 U.S.C. 154(b) by 1065 days.

(21) Appl. No.: 13/441,798

(22) Filed: Apr. 6, 2012

(65) Prior Publication Data
US 2012/0278043 A1 Nov. 1, 2012

(30) Foreign Application Priority Data

Apr. 8, 2011 (GB) .................................. 1106030.8
Jul. 11, 2011 (GB) .................................. 1111861.9

(51) Int. Cl.
*G01D 5/353* (2006.01)
*G01D 1/00* (2006.01)
*G01D 1/02* (2006.01)

(52) U.S. Cl.
CPC ............ *G01D 5/35358* (2013.01); *G01D 1/00* (2013.01); *G01D 1/02* (2013.01); *G01D 5/3539* (2013.01); *G01D 5/35345* (2013.01); *G01D 5/35361* (2013.01); *G01D 5/35367* (2013.01); *G01D 5/35387* (2013.01); *G01D 5/35393* (2013.01); *G01D 5/35396* (2013.01); *G01D 5/35303* (2013.01); *G01D 5/35312* (2013.01); *G01D 5/35329* (2013.01)

(58) Field of Classification Search
None
See application file for complete search history.

(56) References Cited

U.S. PATENT DOCUMENTS

| | | | |
|---|---|---|---|
| 5,194,847 A | 3/1993 | Taylor | |
| 8,947,232 B2 | 2/2015 | Strong et al. | |
| 2006/0184334 A1 | 8/2006 | Sendelbach | |
| 2008/0088846 A1* | 4/2008 | Hayward et al. | 356/446 |
| 2008/0144016 A1 | 6/2008 | Lewis et al. | |
| 2010/0014071 A1 | 1/2010 | Hartog | |
| 2010/0067018 A1* | 3/2010 | Crickmore et al. | 356/477 |
| 2011/0292763 A1* | 12/2011 | Coates | E21B 47/01 367/25 |
| 2012/0280117 A1* | 11/2012 | Lewis et al. | 250/227.17 |
| 2013/0222811 A1* | 8/2013 | Handerek | 356/477 |

FOREIGN PATENT DOCUMENTS

| | | |
|---|---|---|
| CA | 2763389 | 12/2010 |
| CN | 101539631 | 9/2009 |
| DE | 3129301 | 2/1983 |
| EP | 1912050 | 4/2008 |

(Continued)

*Primary Examiner* — Gordon J Stock, Jr.
(74) *Attorney, Agent, or Firm* — McDonnell Boehnen Hulbert & Berghoff LLP

(57) ABSTRACT

The application describes methods and apparatus for distributed fiber sensing, especially distributed acoustic/strain sensing. The method involves launching interrogating radiation in to an optical fiber and sampling radiation backscattered from within said fiber at a rate so as to acquire a plurality of samples corresponding to each sensing portion of interest. The plurality of samples are divided into separate processing channels and processed to determine a phase value for that channel. A quality metric is then applied to the processed phase data and the data combined to provide an overall phase value for the sensing portion based on the quality metric. The quality metric may be a measure of the degree of similarity of the processed data from the channels. The interrogating radiation may comprise two relatively narrow pulses separated by a relatively wide gap and the sampling rate may be set such that a plurality of substantially independent diversity samples are acquired.

55 Claims, 12 Drawing Sheets

(56) References Cited

FOREIGN PATENT DOCUMENTS

| GB | 2207236 | 1/1989 |
| GB | 2 222 247 | 2/1990 |
| GB | 2 441 154 | 2/2008 |
| GB | 2 442 745 | 4/2008 |
| WO | WO 2007/049004 | 5/2007 |
| WO | WO 2011/039501 | 4/2011 |
| WO | WO 2011/067554 | 6/2011 |

* cited by examiner

FIBRE OPTIC DISTRIBUTED SENSING

FIELD OF THE INVENTION

This invention relates to fibre optic distributed sensing and in particular to methods and apparatus for determining phase modulations on said fibre, and especially to fibre optic distributed acoustic sensing.

BACKGROUND OF THE INVENTION

Fibre optic distributed acoustic sensors are known. Such sensors interrogate optical fibres with optical radiation and measure changes to the radiation resulting from acoustic waves affecting the optical fibre.

U.S. Pat. No. 5,194,847 (Texas A&M Univ) describes interrogating a fibre with a repeated coherent pulse of radiation and detecting any radiation which is Raleigh backscattered within the fibre. The fibre is interrogated with a single pulse at a time and the amplitude of the backscattered radiation is analysed to detect any disturbance of the fibre by acoustic/pressure waves. This document teaches that a buried optical fibre can be used as a distributed acoustic sensor for perimeter monitoring purposes.

UK Patent Application GB2,222,247 (Plessey) describes another distributed fibre optic sensor system in which changes in environmental parameters, such as sound waves, are sensed by transmitting pulses of light along an optical fibre. This document describes that two closely spaced pulses may be transmitted into the fibre, the first pulse having a different frequency to the second pulse. The backscatter from the pulses within the fibre can be detected and analysed at a carrier frequency equal to the frequency difference between the interrogating pulses. The signals received at a detector can be gated and processed to determine information representative of changes in environmental parameters affecting a desired section of the optical fibre.

UK patent application GB2,442,745 (AT&T) describes distributed acoustic sensing using an optical fibre. This document again teaches use of pulse pairs, wherein the individual pulses of a pulse pair have different frequencies. The backscattered signal is analysed at a carrier frequency corresponding to the frequency difference between the pulses in the pulse pair. This document teaches applying a complex demodulation to the detected backscatter signal at the known frequency difference between the pulses in a pulse pair to provide in-phase (I) and quadrature (Q) signals for the carrier frequency. These are then converted to provide the phase and amplitude of the signal. The phase of successive samples from the same section of fibre is then monitored to determine any acoustic signals incident on that section of fibre.

This document (GB2,442,745) teaches that the frequency difference between pulses in a pulse pair should be related to the pulse width. The example is given of pulses of 20 m width and a frequency difference between pulses in a pair of at least 5 MHz.

Whilst the technique described in GB2,442,745 is useful, in some instances the baseband structure inherent in such a fibre optic sensor, i.e. a random but systematic pattern in the detected backscatter, can mask or destroy the carrier signal and reduce the signal to noise ratio of the sensor. This baseband structure of the system arises partly from the random distribution of the scattering sites in the optical fibre, from thermal drift etc. and thus can not be eliminated. The effect of cross over of the measurement signal and baseband noise of the system can be mitigated by using higher carrier frequencies, for instance of the orders of hundreds of MHz. However use of such a high carrier frequency would require detector sample rates in excess of hundreds of MHz. This not only would require very fast components for the interrogator unit and greatly increase the amount of processing required but a much higher detector bandwidth would also impact on the sensitivity of the detector.

SUMMARY OF THE INVENTION

The present invention provides improved methods and apparatus for fibre optic distributed sensors, especially distributed acoustic sensors which mitigate at least some of the aforementioned disadvantages.

Thus according to a first aspect of the present invention there is provided a distributed fibre optic sensor apparatus comprising: an optical source configured to, in use, launch interrogating radiation into an optical fibre; a sampling detector configured to, in use, sample interrogating radiation which is backscattered from within said optical fibre; and a processor configured to determine any phase modulation for at least one spatial sensing portion of said optical fibre wherein said processor is configured to: take a plurality of samples corresponding to radiation backscattered from at least part of a spatial sensing portion of interest following each launch; divide said plurality of samples into a plurality of processing channels; process at least some of said plurality of processing channels to determine at least phase data for said channel; apply a quality metric to said data from said processing channels; and combine the determined phase data for said channels into an overall phase value for said spatial sensing portion of interest based on the results of applying said quality metric.

In use the distributed fibre optic sensor repeatedly interrogates the optical fibre with interrogating radiation and detects any interrogating radiation which is backscattered from within the fibre as is conventional in distributed fibre optic sensors. The sensor analyses the radiation backscattered from the optical fibre from different launches of interrogating radiation to determine, for sensing portions of interest, whether there is any phase modulation in the detected radiation.

As will be described in more detail later the backscattered radiation reaching the detector will be scattered from intrinsic scattering sites within the optical fibre. The radiation reaching the detector at any instant will correspond to radiation backscattered from scattering sites which are distributed throughout one or more sections of the optical fibre (depending on the form of the interrogating radiation). The various backscattered signals will interfere at the detector and the resultant interference signal will have a phase characteristic which depends on the characteristics of the interrogating radiation, the optical path length to the scattering sites and also on the distribution of the scattering sites within the optical fibre. As the distribution of the scattering sites is effectively random the resulting interference signal has a random element. In effect the scattering sites form an interferometer and the relative phase bias position of this interferometer depends on the distribution of the scattering sites within the fibre, which is random. However, in the absence of any external stimuli the backscatter characteristic from a first set of scattering sites will be substantially the same between successive launches of interrogating radiation, i.e. the phase bias position will remain the same on the time scale between launches.

Any stimulus on the optical fibre which leads to an optical path length change within the optical fibre, such as incident acoustic or other pressure waves or strains on the optical fibre, may result in a phase modulation in the backscatter signal for the relevant portion of the optical fibre, i.e. a change in the phase characteristic of the backscatter signal from a given portion of optical fibre over time. Thus, by determining the presence and extent of any phase modulation affecting a spatial sensing portion of interest, any stimulus, such as an acoustic stimulus, affecting the optical fibre within that sensing portion may be detected.

As the distribution of the scattering sites is effectively random there is the possibility that the backscatter signals from a given set of scattering sites interfere destructively to effectively cancel out or otherwise produce a resultant signal with of a low intensity, below the noise floor of the system. In other words the interference signal may suffer from fading. Even if the signal has not completely faded it may suffer from a low signal-to-noise ratio which may reduce the sensitivity or accuracy of the sensor. Thus were a single sample to be acquired for each spatial sensing portion of interest there is the possibility that such a sample would suffer from fading and no reliable interference signal could be detected, or that the signal to noise ration of the interference signal would be low.

In the distributed fibre optic sensor according to this aspect of the invention a plurality of samples of the backscattered radiation are acquired for each sensing portion of interest from each launch of interrogating radiation. The plurality of samples corresponding to the sensing portion of interest are processed to determine a phase value for that sensing portion and thus the samples may be analysed in an analysis bin corresponding to the sensing portion of interest. Thus, for example, the distributed fibre optic sensor may be arranged so as to provide a plurality of longitudinal sensing portion of fibre, each sensing portion of fibre having a particular length, for example 10 m. The sampling rate of the sampling detector is thus set high enough that for each 10 m section of fibre a plurality of individual samples are taken. The individual samples can be seen as diversity samples.

According to this aspect of the present invention the processing of the backscatter data involves dividing the plurality of diversity samples into a plurality of processing channels and processing at least some of the channels to determine phase data for the channel. A quality metric is then applied to the processed data. The phase data determined for the channels is then combined, taking the quality metric into account, to provide the phase value for the sensing portion of interest. This results in overall phase value for the sensing portion of interest that is less susceptible to fading and has a better signal-to-noise ratio than compared to conventional distributed fibre optic sensors. The overall phase value can then be used to detect any phase modulation affecting the sensing portion of interest.

In effect the quality metric determines whether the data from a particular channel is of high or low quality. This assessment of the quality of the data from the channels is then taken into account when combining the data from the various channels to ensure a high quality phase value for the sensing portion of interest.

There are various ways in which the data can be combined taking the quality metric into account, for example lower quality data could be given a lower weighting than higher quality data or omitted entirely from the combination, as will be described in more detail later. In this way the relative quality of the data channels can be taken into account when combining the data from the various channels, with the result that any channels which suffer from high noise or a low signal-to-noise ratio may have less influence on the overall phase value than those channels which have a good signal-to-noise ratio.

Advantageously the quality metric may comprise a determination as to the degree of similarity between the data for a given channel and data from the other processed channels. In other words the data from the processed channels is analysed to determine whether the results from one channel are similar to the results from the other channels. The processor may therefore analyse the data from the various channels. The processor may determine a score based on how similar the data from one channel is to the data from another channel.

The present inventors have realised that, for a distributed fibre optic sensor of the type described above, when an external stimulus affects a sensing portion of interest it may well affect a number of samples corresponding to that sensing portion of interest in substantially the same way. In other words, under ideal conditions each of the plurality of diversity samples corresponding to the sensing portion of interest will reveal the same degree of phase modulation.

As mentioned above for a distributed acoustic sensor the length of the sensing portions of interest may be of the order 10 m or so or less, and some embodiments may use much shorter sensing portions of interest, for example of the order of 1 m or so. For a sensing portion of the order of 10 m or so acquiring a plurality of diversity samples corresponding to that sensing portion (from each individual launch of interrogating radiation) requires a fast sampling time. The sampling detector may be configured to acquire a plurality of samples in the time taken for the interrogating radiation to travel in the fibre a distance equal to twice the length of the sensing portion of interest. For example acquiring ten samples corresponding to a 10 m sensing portion of optical fibre requires acquiring ten samples in the time taken for radiation in the optical fibre to travel 20 m (i.e. the time for light to have traveled 10 m further into the fibre and return). Thus, for an optical fibre with a refractive index of about 1.5, a sampling rate of about 100 MHz would be required. Diversity samples may therefore be acquired at relatively high samples rates, of the order of a hundred MHz or so, which is much faster than the rate of evolution of the disturbance on the optical fibre being measured. Over this time scale even the highest frequency acoustic signals likely to be detected by the distributed fibre optic sensor will not change much. For distributed fibre optic sensors where the fibre optic is buried in the ground or embedded in a material frequencies above a few hundred Hz are likely to be strongly attenuated and the sensor will mainly detect frequencies of 200 Hz or less. Further for such incident signals it is likely that any incident acoustic wave causing an optical path length change within the fibre within a sensing portion of interest is likely to affect most of a 10 m section of fibre. Thus the assumption can be made that each of the plurality of samples corresponding to the sensing portion of interest is measuring the same incident stimulus.

This embodiment of the invention therefore operates on the assumption that, after processing, the data from each channel should, under ideal non-faded conditions, reveal the same phase modulation. Thus channels where the processed phase data is similar to the data from other channels may indicate that the relevant channels are all measuring the same stimulus correctly, whereas any channels where the processed data does not match that of the other channels may indicated a faded or noise dominated sample.

The quality metric is therefore applied to the processed phase data from the processed channels to determine the degree of self similarity between the processed channels. The degree of self similarity between the processed data from the various channels, may be determined by the processor correlating the data from one channel with that from the other channels.

In one embodiment the quality metric determines the similarity between the data from two channels by determining, for each channel, the degree of variation of current value from the average value for that channel. The metric may comprise multiplying the degree of variation from each channel together, i.e. the quality metric may comprise determining, for two channels, a first metric of the form $M1(A, B)=(A-<A>)\cdot(B-<B>)$, where A and B are the current data values from the channel and $<A>$ and $<B>$ are the average values of the data from the channels. This metric alone can however give a large result for a signal with a large DC component. Advantageously therefore a second metric, M2, may be used to determine a measurement of the magnitude of the difference between the two signals. The metric M2 may be of the form $M2(A, B)=((A-<A>)-(B-<B>))^2$. These two metrics may be calculated for each combination of channels and used to determine the channels which are most similar to one another. An overall metric $M_Q$ may be calculated by determining the difference between the first and second metrics, i.e. the quality metric may be of the form $M_Q(A, B)=M1(A, B)-M2(A, B)$ or the difference between the average values of the first and second metrics, i.e. $M_Q(A, B)=<M1(A, B)>-<M2(A, B)>$. The value of the calculated quality metric $M_Q$ may then be used to determine those channels which are most self similar.

In one embodiment, the processor determines, for each channel, the result of the quality metric when considering the data for each other channel. Using a metric such as described above this will result in effectively a series of scores as to how similar the current data from that channel is to the data from another channel. Thus for a first channel there will be a score for each of the other channels.

The phase data may then be combined with an appropriate weighting applied to the results of each processed channel based on this quality metric. For instance data from channels which are very similar to one another may be given relatively high weightings in the combination whereas processed phase values that are less similar to one another may be given relatively low weightings in the combination. In this the way the combination, in effect, gives more weight to good quality samples and less weight to poor quality samples and thus improves the signal to noise ratio compared to the conventional combination technique.

Additionally or alternatively only a subset of the processed values from the channels, those which are self-similar, may be used to form the combined phase value.

The subset may comprise the data from a pre-determined number of channels. In other words the method may comprise the step of selecting the M most self-similar results from the N channels available, when N>M and the value of M is predetermined. For example if there are about 10 samples acquired that correspond to a particular sensing portion of fibre and each is processed in a separate channel, i.e. N=10, then, for example, the five most self similar processed data values (M=5) may be chosen to be combined. Thus the number of channels, and hence samples, which are used when forming the combined phase value may be constant over time and may be the same for each sensing portion of fibre. This may ease some of the later processing as each combined phase value is formed from the same number of individual samples. The number, M, of channels from which data is taken to form the subset may be configured in advance by a user of the sensor.

Alternatively the number of channels of processed data used to form the subset may be variable based on the data itself. For example a quality metric could be applied to the results from each individual channel to determine the degree of self similarity to data from other channels and all results which are sufficiently similar to one another may be combined, which may in some circumstances include all channels. The data from each channel may be given a score and any data with a score above a set threshold may be used in the combination. Thus if eight out of ten processed data values are similar to one another, e.g. score sufficiently highly, these eight similar data values may be combined but, for another sensing portion of fibre, if only four channels produce results that are similar to one another then only the data from those four channels may be combined.

Changing the number of channels used for the combination to produce the overall phase value will affect the noise properties of the system. The processor may therefore be arranged to calibrate the overall phase value based on the number of channels used in the combination. The processor may also provide an indication of the number of channels of an analysis bin that were used in performing the combination.

It will also be appreciated that the phase centre of the resulting value for the sensing portion of interest may vary depending on the channels actually selected for combination. Each of the plurality of samples corresponding to the sensing portion of interest will comprise backscattered radiation from a slightly different section of optical fibre. Thus, for example, if data from five channels out of ten possible channels are selected for combination, then if the first five channels are the ones selected the phase centre of the resulting combined value will be skewed to one side of the sensing portion. The processor may therefore also be arranged to provide an indication of the relevant channels or at least the spread of channels used in the combination and/or an estimate of phase centre.

As mentioned above a quality metric based on the self-similarity of the demodulated phase values of the channels corresponding to the sensing portion of interest relies on the assumption that each of the various channels is experiencing the same general stimulus. This is a reasonable assumption in most instances but it may not be sufficient for some precision applications or where incident waves with high wavenumber may be expected. In such cases it may be desirable to apply some time adjustment to the phase values of each channel prior to assessment to take into account a direction of arrival of the acoustic stimulus, i.e. to apply some beamforming type techniques.

In one embodiment the plurality of samples corresponding to the sensing portion of interest may also be processed to determine an amplitude data for the measurement signal as well as a phase value. The amplitude data may also be used in a quality metric. If a sample is acquired which suffers from fading then the demodulated measurement signal will tend to have a low amplitude variation. However the amplitude variation may also be low for high quality signals that happen to coincide with a phase bias position that leads to maximum backscatter intensity. The processor may therefore be adapted to determine AC to DC ratio of the amplitude data from each channel, i.e. the ratio of the level of amplitude variation compared to the average amplitude for each channel based on the current amplitude value and a few previous values. The AC to DC ratio may used as an indication of the current signal-to-noise ratio of the relevant channel data. A relatively high ratio may indicate a relatively high SNR whereas a low value may represent a low SNR. The derived phase values from channels with an AC to DC ratio value below a threshold may therefore be discarded. Additionally or alternatively the phase values may be given a weighting in forming the combined value with the weighting being, at least partly, based on the AC to DC ratio.

The processor may be arranged to process each of the plurality of samples corresponding to the sensing portion of interest to derive a processed phase and possible amplitude value. Thus if there are say eight samples acquired corresponding to each sensing portion of interest then there will be eight channels and each may be processed. In one embodiment however the processor is configured to estimate the signal to noise ratio for a channel and only process the data in that channel if the signal to noise ratio is above a certain threshold. The processor may therefore be configured to determine the average intensity of the diversity samples in each channel, i.e. the samples acquired for a particular diversity channel from launch to launch, before processing the samples to determine a phase value for that channel. A low average intensity of the sample is likely to indicate that the relevant channel is currently faded. Thus, to reduce processing overhead, channels for which the average intensity is below some set limit may not be omitted from the processing.

Advantageously the majority of the plurality of samples corresponding to the sensing portion of interest are substantially independent diversity samples.

As mentioned above at any given instant the backscatter signal received at the detector may comprise radiation which is backscattered from one or more sections of the optical fibre, depending on the form of the interrogating radiation. Typically the interrogating radiation will comprise one or more pulses of optical radiation (note, as used herein the term optical radiation will include infrared or ultraviolet radiation as well as radiation at visible wavelengths). For example were the interrogating radiation to comprise two pulses separated by a gap then the backscatter radiation reaching the detector at any instant would arise from two separate sections of fibre, the two contributing sections being separated by a gap.

Each sample therefore effectively corresponds to the backscatter signal from one or more contributing sections depending on the form of the interrogating radiation. The contributing sections of the optical fibre effectively define a sampling window. The position of the sampling window in the fibre depends on the time after launch of the interrogating radiation. Between any two successive samples the position of the respective contributing sections, and hence the sampling window, within the optical fibre will have moved.

The plurality of samples are therefore advantageously acquired such that, for each sample, each contributing section of optical fibre from which a backscatter signal could be received from a pulse of interrogating radiation is substantially independent of the corresponding contributing section of the majority of the rest of the plurality of samples. In other words there is substantially no overlap between the corresponding contributing sections for the majority of samples. Thus if the interrogating radiation comprises a first pulse and a second pulse separated by a gap, thus defining for each sample, a first contributing section and a second contributing section, then the samples are acquired so that the position of the first contributing section for a sample does not substantially overlap with the position of the first contributing section for the majority of the other samples and likewise the position of the second contributing section for that sample does not substantially overlap with the position of the second contributing section for the majority of the other samples.

If there were significant overlap between the corresponding contributing sections for two or more samples then such samples would not be wholly independent of one another. The optical characteristics for the composite signal arising for any scattering sites in the area of overlap would be effectively the same for each sample and were the first sample to exhibit strong fading of the interference signal then the second sample would also be likely to exhibit strong fading. By ensuring that the corresponding contributing sections do not overlap for the majority of samples then a plurality of independent diversity samples are acquired for a sensing portion of interest. It is by processing substantially independent samples and then combining the high quality samples that the best benefits of improved signal to noise ratio and resistance to fading are achieved.

In some embodiments the plurality of samples may be acquired such that, for each sample, each contributing section is substantially independent of the corresponding contributing sections of 75% or more of the rest of the plurality of samples. For those samples within the plurality of samples corresponding to the sensing portion of interest where there is some overlap, the degree of overlap between a contributing section of optical fibre for one sample compared with the corresponding contributing section for any other sample within the plurality of samples may be 50% or less, or in some embodiments 25% or less or in some embodiments by 10% or less. In some embodiments each sample is arranged so that each contributing section is substantially independent of the corresponding contributing section for all of the rest of the samples of the plurality.

It will be appreciated that where the interrogating radiation comprises at least first and second pulses of radiation, thus resulting in at least respective first and second contributing sections of optical fibre for each sample, that a section of optical fibre which forms part of a first contributing section for one sample may also form part of a second contributing section for a different sample, i.e. there may be overlap between the position of the first contributing section for one sample and the second contributing section for a second sample. Overlap of different (non-corresponding) contributing sections in different samples is much less of a concern however than overlap of corresponding contributing sections. For example the first and second pulses may have different optical characteristics, such as different frequencies, and a given distribution of scattering sites will give rise to a different composite signal in response to a first pulse at a first frequency as compared to a second pulse at a second frequency. Even were the optical characteristics of the two pulses to be exactly the same, the requirement that, for the majority of samples, the corresponding contributing sections for each sample do not substantially overlap will mean that the majority of samples are largely independent.

The degree of overlap between contributing sections of optical fibre that contribute to different samples is determined by the time between the relevant samples and the form of the interrogating radiation. For instance, consider an individual pulse of interrogating radiation travelling in the optical fibre so as to define a contributing section of fibre at a first position for a first sample and at a second position for a second sample. The degree of overlap between the corresponding contribution sections depends on the duration of the pulse, which defines the spatial width of the pulse in the optical fibre, and also the time between the first and second samples. If the pulse has a duration $T_p$ and the time between the first and second samples is equal to a quarter of $T_p$ then three quarters (¾) of the contributing section for the first sample will overlap with the contributing section for the second sample, i.e. there will be a 75% degree of overlap.

The sampling rate of the detector may therefore be arranged with regard to the form of the interrogating radiation to acquire the diversity samples as described above. Thus in one embodiment the interrogating radiation may comprise at least a first pulse having a first pulse duration and the plurality of samples are acquired such that the time difference between samples is greater than the first pulse duration for the majority of the plurality of samples. In other words if a first sample is acquired at a first sampling time then most of the rest of the plurality of samples are acquired at a sampling time which differs from the first sampling time by more than the pulse duration. The samples may be acquired such that the time difference between any two samples in the plurality of samples corresponding to the sensing portion of interest is at least 50% of the pulse duration. In some embodiments the time difference between any two samples may be 75% or more of the pulse duration and in some embodiments the time difference may be at least equal to the pulse duration.

Conveniently the sampling rate of the detector is arranged such that a series of successive samples can be used directly as the plurality of samples corresponding to a sensing portion of interest. However if the sampling rate was such that successive samples were not deemed sufficiently independent then the plurality of samples could be formed by taking only a subset of the samples that would be acquired at that sampling rate. For instance every nth sample could be used to form the plurality of samples corresponding to a sensing portion of interest.

In one embodiment the optical source may be configured such that the interrogating radiation comprises a first pulse and a second pulse with a gap or delay between them, i.e. the interrogating radiation may comprise a pulse pair with a temporal (and hence, within the optical fibre, spatial) separation between the pulses of the pair. The duration (and hence spatial width) of the first pulse may be the same as the duration of the second pulse, although they need not be the same. In one embodiment the duration between the first and second pulses, i.e. the time between end of the first pulse and beginning of the second pulse, may be equal to or greater than the pulse duration of the first and/or second pulse. In other words the spatial width of one (and advantageously both) pulses may be shorter than the spatial separation between pulses. Advantageously the gap between the first and second pulses may be at least twice the pulse width. A pulse structure that has relatively narrow pulse widths compared to the gap between pulses can be advantageous in terms of allowing diversity samples to be acquired within the maximum achievable spatial resolution of the sensor.

As mentioned above interrogating the optical fibre with a pulse pair comprising a first pulse separated in time from a second pulse ensures that each sample will correspond to the backscatter signals from a first contributing section of first and second contributing section of fibre, separated by a gap. The length of fibre which comprises the two contributing sections and the gap in between them is effectively the sampling window for that sample and any acoustic modulation acting on the fibre within the sampling window, but especially between the two contributing sections may lead to a detectable phase modulation.

By using interrogating radiation wherein the pulses are relatively narrow compared to gap between them samples can be acquired that are substantially independent diversity samples, as discussed above, but wherein the sampling window for the samples may overlap. For example consider interrogating radiation which comprises two pulses, both having the same pulse duration, separated by a gap which is at least twice the pulse duration. For such interrogating radiation the sampling window for each sample corresponds to two contributing sections of optical fibre, each of a certain width (equal to half the pulse width within the fibre), separated by a gap equal to at least twice the width of the contributing sections. If the sample rate is set equal to the pulse duration then in the time between samples the position of the sampling window in the fibre will effectively move by a distance equal to the width of the contributing sections. Thus between a first sample and a second sample there will be substantially no overlap between the corresponding contributing sections for each samples but the sampling windows for successive samples will substantially overlap. Thus any acoustic stimulus affecting the fibre within both sampling regions can be detected from each sample independently. Interrogating radiation of this form is thus particularly advantageous when using a quality metric based on the similarity of the processed data from each diversity channel.

It will be understood that each sample in the plurality of samples corresponds to the sensing portion of interest in that the sampling window for each such sample will lie at least partly within the sensing portion of interest. It should be noted however that the sampling window may lie only partly within the sensing portion of interest and may also lie partly outside the sensing portion of interest. For example consider that the interrogating radiation comprises first and second pulses with a gap between them such that the sampling window corresponding to each sample is a first length in the optical fibre, say 10 m for example. Thus the best achievable spatial resolution of the distributed fibre sensor is equal to the first length, i.e. 10 m. The sensing portions of interest may therefore be defined to be sections of optical fibre of the same length as the first length, i.e. 10 m, which is the best achievable spatial resolution. The sampling rate of the detector is set such that a certain number of samples are acquired for each sensing portion of interest, i.e. in the time taken for the sampling window to move a distance in the fibre which is equal to the length of the sensing portion, for instance ten samples could be acquired, which for a sensing portion of 10 m in length requires the position of the sampling window to differ by 1 m between samples. The sensing portion of interest may then be taken to be any 10 m section of fibre between the position of the sampling window for the first sample and that for the last sample but conveniently it is taken to be the 10 m section of optical fibre which is halfway between the positions of the sampling windows for the first and last samples.

In one embodiment, where the interrogating radiation comprises two pulses, i.e. a pulse pair the optical source may be configured such that the pulses of the pulse pair have a frequency difference between them, i.e. the first pulse has a different frequency to the second pulse. The frequency difference may define a carrier frequency such as described in GB2,442,745.

It will be noted that GB2,442,745 does discuss acquiring a plurality of samples for a sensing portion of interest. The example is given that a sensing portion of interest is of the order of 20 m long and samples are acquired at a rate such that between each sample the position of the sampling window for each sample will be moved of the order of just over 1 m. However GB2,442,745 does not process each sample separately in a diversity channel to derive a phase value. GB2,442,745 teaches generating I and Q signals from each sample and then effectively averaging the samples together using an FIR filter and then taking a single output value for each sensing portion of interest. Only then is the average value processed to determine a phase value. Thus GB2,442,745 effectively teaches averaging several samples together before processing. It is further noted that in GB2,442,745 the preferred form of interrogating radiation is pulses of radiation of the order of 20 m long which either overlap or are contiguous. Thus the individual samples acquired at a sampling rate of 100 MHz would not be largely independent.

In another embodiment however the optical source is configured to repeatedly launch pulse pairs into the optical fibre wherein the pulses pairs in successive launches have the same frequency configuration as one another and are generated such that the phase relationship of the pulses of one pulse pair has a predetermined relative phase difference to the phase relationship of a successive pulse pair.

The sensor apparatus according this embodiment ensures that the relative phase relationships of the pulses in pulse pairs are controlled. The pulse pairs therefore have a known relative phase encoding. This known phase encoding ensures that the backscatter interference signal from any given location in the optical fibre illuminated by a first pulse pair has the same predetermined relative phase difference to the interference signal generated by a second pulse pair from the same location in the optical fibre. By control of this phase encoding an analytic version of the interference can be generated. Thus, for a given location in the optical fibre, the backscatter signal generated by first and second (i.e. successive) pulse pairs can be processed to determine a phase value for that section of optical fibre, even when the interference signal is within the baseband noise of the sensor, as will be described in more detail later. The phase values determined for a given section of optical fibre over time can then be monitored to detect any phase modulations due to acoustic stimulus on the fibre.

The processor may therefore be configured to determine a phase value for at least one given section of optical fibre based on the detected backscatter radiation from successive pulse pairs. Thus the phase value is effectively demodulated using samples acquired from launches of different pulse pairs.

It will be appreciated by one skilled in the art that the pulses of the pulse pair should be sufficiently coherent, over the time scale of the measurements, to allow processing to determine the phase value. The optical source may therefore be a highly coherent source.

In one embodiment the predetermined relative phase difference has a magnitude of the order of 90°. Having a predetermined relative phase difference equal to 90° can be advantageous in terms of ease of subsequent processing and good quality of returns as will be described. As mentioned the backscatter interference signals from successive pulse pairs will exhibit the predetermined phase difference. In some embodiments therefore using a 90° phase difference allows the backscatter signals to be used directly as in-phase (I) and quadrature (Q) components. These components may be processed to derive I and Q values which can be converted to a phase value by rectangular to polar conversion for example. However other predetermined relative phase differences could be used if desired.

The pulse pairs have the same frequency configuration as one another. As used in this specification the term frequency configuration will be taken to mean the absolute frequencies of the pulses in the pulse pair. So if the pulses of a first pulse pair are at frequencies F1 and F2 respectively (which may or may not be the same frequency) then the frequencies of a second pulse pair are also F1 and F2 respectively.

In one embodiment the pulses in the pulse pairs have a frequency difference between them and the pulse pairs are generated so as to be launched into the optical fibre such that the time between launch of the different pulse pairs corresponds to the time for the predetermined relative phase change in a signal at a frequency equal to the frequency difference between the pulses in a pair.

In this embodiment the each pulse pair comprises pulses having a frequency difference between the pulses in the pair. As described above this will lead to a backscatter interference signal at a carrier frequency equal to the frequency difference between the pulses. In this embodiment of the present invention the carrier frequency is related to the launch rate of the pulse pairs.

As will be described in more detail later this embodiment of the invention allows a carrier signal to be determined from launch-to-launch. Thus a signal from each portion of fibre, i.e. comprising samples of the backscatter radiation acquired at substantially the same time after launch of each pulse pair, can be demodulated at the relevant carrier frequency and used to derive a phase value for the appropriate section of fibre. To accurately reproduce the carrier signal from launch-to-launch samples the carrier frequency should be less than half the launch rate. Advantageously the time between launch of pulse pairs may allow for a predetermined relative phase change of 90° in the interference signal at the carrier frequency. A 90° phase change allows an accurate carrier signal to be reproduced from launch-to-launch and reduces any unnecessary oversampling. To achieve a 90° relative phase difference the time period between launch of the first pulse pair and the second pulse pair may be equal to a quarter of the wave period at the carrier frequency. In other words the carrier frequency may be a quarter of the launch rate of the pulse pairs.

This embodiment therefore uses the fact that the phase relationship of signals at two different frequencies, say F1 and F2, will change over time. In the time between launch of the successive pulse pairs there will be time for n cycles of a signal at a frequency F1 and for m cycles of a signal at a frequency of F2. This embodiment controls the frequencies, F1 and F2 of the pulses in a pair and the launch rate of the pulse pairs such that in the time between launches n−m has a desired value, for instance 0.25 when a 90° phase difference is desired.

It will therefore be appreciated that the optical source produces the pulses of the pulse pairs with the same properties as if they were derived from two stable frequency sources, one running at F1 and the other at F2. In practice ensuring suitable stability from two separate sources may be difficult and so a single source such as a laser and a frequency modulator will typically be used. Provided that the laser and modulator are temporally coherent then the light produced for the pulses of the successive pulse pairs will exhibit the same properties. The optical source may therefore comprise at least one laser and least one modulator for modulating the light from the laser to produce the first and second pulse pairs. For example the modulator may comprise an acousto-optic modulator although any suitable frequency modulator, possibly will an intensity modulator or switch, may be used to generate the pulses.

It will be appreciated that as successive pulse pairs have the same frequency configuration as one another an interference signal from a first pulse pair from any part of the fibre should not be received at the detector at the same time as any interference signal from a second pulse pair is received at that detector. The sensor may therefore be configured such that more than one pulse pair can not be in the sensing part of the optical fibre at the same time, i.e. the part of the optical fibre from which any backscatter returns may reach the detector. Thus the time between launching one pulse pair and another pulse pair may be sufficient to allow for any signal returns from the first pulse pair travelling through the optical fibre to have reached the detector before launching the second pulse pair. For a sensing fibre having a length of the order of 40 km this requires time between pulse pairs of at least about 0.40 ms (assuming a refractive index for the fibre of 1.48) or a launch rate slower than about 2.5 kHz. For a fibre of 5 km in length the launch rate may be of the order of 20 kHz.

As mentioned above the carrier frequency may be lower than, i.e. a fraction of, the launch rate and thus the carrier frequency, i.e. the frequency difference between the pulses in the pulse pairs, may be of the order of a few kHz, for example 10 kHz or less, or 5 kHz or less or 1 kHz or less. At this launch rate the carrier frequency will be well within the baseband of the sensor but the carrier signal is detectable from launch to launch and thus a useable signal can be generated and phase changes of this signal used to determine incident acoustic stimulus on the relevant section of optical fibre.

In another embodiment each pulse pair comprises two pulses having the same frequency as one another and the phase difference between the pulses in one pulse pair differs from the phase difference between the pulses in a successive pulse pair by said predetermined relative phase difference. In other words the two pulses in a first pulse pair are at the same frequency as one another and have a certain phase relationship at launch. In general there will be a relative phase difference of $P_1$ between the light in the first and second pulses of this first pulse pair. The two pulses in a second pulse pair are also at the same frequency as one another (and also the pulses in the first pulse pair) and also have a certain phase difference, $P_2$, between them. However the phase difference between the pulses in the first pulse pair is arranged to differ from the phase difference between the second pulse pair by the predetermined relative phase difference. For example if the predetermined relative phase difference is 90° then $P_2$ may be equal to $P_1+90°$.

Varying the phase difference between the pulses in successive pulse pairs will result in a variation in the relevant phases of the component backscatter signals which form the resulting interference signal. This variation in phases allows the signals from successive pulse pairs from the same location of the fibre to be processed to determine a phase value for that section of fibre. For any given diversity channel (defined by the time of sampling after launch of a pulse pair) the contributing sections of optical fibre will be the same for the first launch as for the second launch. Over the short time between launch of subsequent pulse pairs, any path length changes will be minimal. Thus the only significant variation will be due to the controlled variation in phase difference between the pulses of the first and second pulse pairs. This applies equally to all the scattering sites contributing to the interference signal.

In one embodiment the variation in phase difference between the launches is set to be equal to 90°. Using a phase difference variation of 90° between successive launches means that the signals from a given section of fibre received from successive launches inherently provides I and Q component information. Thus these signals may be low pass filtered to provide I and Q values and a phase value determined for that channel through standard rectangular-to-polar conversion. It will be appreciated however that other values of variation in phase difference could be used and the signals from each channel could be filtered and processed using other conversion schemes appropriate to the phase variation used.

This embodiment therefore provides a backscatter interference signal wherein there is a variation in the relative phase difference between the pulses in successive pulse pairs. The returns from the successive pulse pairs can therefore be used to determine a phase value for the relevant channel which can then be subject to the quality metric as described above.

The optical source may therefore comprise at least one laser and at least one phase shifter, such as an electro-optic modulator, arranged to modulate the laser output so as to produce the first and second pulse pairs. There may also be an intensity modulator or switch to produce the pulses.

The embodiments described above can also be used with wavelength multiplexing techniques to allow additional pulse sequences having different frequency configurations to be present in the sensing optical fibre at the same time. The additional pulse sequences could comprise pulse pairs as described above although other pulse sequences, such a single pulse or other configurations of pulse pairs, may also be used.

For the avoidance of doubt it should be noted that the term pulse pair, as used herein, refers to a signal comprising at least two distinct pulses of light. The individual pulses may be distinct in terms of temporal separation or frequency separation or both. In some embodiments the pulse pair may form part of a longer series of pulses, for instance imagine three pulses each of different frequency, F1, F2 and F3 wherein the three beat frequencies F1−F2, F2−F3 and F1−F3 are all different from one another. Such a pulse structure could be arranged so that at least one carrier frequency, e.g. F1−F2, is related to launch rate of the pulse train as described above.

The present invention also applies to a method of distributed fibre optic sensing, and in particular to a method of distributed acoustic sensing. Thus according to another aspect of the invention there is provided a method of distributed fibre optic sensing comprising: launching interrogating radiation into an optical fibre; sampling interrogating radiation which is backscattered from within said optical fibre; and determining any phase modulation for at least one spatial sensing portion of said optical fibre wherein the step of determining any phase modulation comprises: taking a plurality of samples corresponding to radiation backscattered from at least part of a spatial sensing portion of interest following each launch; dividing said plurality of samples into a plurality of processing channels; processing at least some of said plurality of processing channels to determine phase data for said channel; applying a quality metric to said processed channels; and combining the determined phase data for said channels into an overall phase value for said spatial sensing portion of interest based on the results of applying said quality metric.

All of the advantages described above in relation to the first aspect of the invention apply equal to the method of this aspect of the invention and the method may be implemented in any of the embodiments described above.

In particular the step of applying the quality metric may comprise determining the degree of similarity between the data for a given channel and data from the other processed channels. The degree of self similarity between the processed data from the various channels, may be determined by correlating the data from one channel with that from the other channels. The phase data may then be combined with an appropriate weighting applied to the results of each processed channel based on this quality metric. Additionally or alternatively only a subset of the processed values from the channels, those which are self-similar, may be used to form the combined phase value. Advantageously the majority of the plurality of samples corresponding to the sensing portion of interest are substantially independent diversity samples. The method may therefore comprise launching interrogating radiation and sampling the detected backscattered radiation such that, for each sample, each contributing section of optical fibre from which a backscatter signal could be received from a pulse of interrogating radiation is substantially independent of the corresponding contributing section of the majority of the rest of the plurality of samples.

The method of the present invention can also be applied to the processing of data which has been previously acquired using a distributed fibre optic sensor, provided that a plurality of samples, advantageously substantially independent samples, are acquired for each sensing portion of interest. Thus in another aspect of the present invention there is provided a method of processing data acquired from a distributed fibre optic sensor to determine any phase modulation comprising the steps of: taking a plurality of samples corresponding to radiation backscattered from at least part of a spatial sensing portion of interest of an optical fibre following launch of interrogating radiation into said optical fibre; dividing said plurality of samples into a plurality of processing channels; processing at least some of said plurality of processing channels to determine phase data for said channel; applying a quality metric to said processed channels; and combining the determined phase data for said channels into a phase value for said spatial sensing portion of interest based on the results of applying said quality metric.

Again all of the advantages described above in relation to the first aspect of the invention apply equal to the method of this aspect of the invention and the method may be implemented in any of the embodiments described above.

In general an aspect of the invention provides a distributed fibre optic sensor, especially a distributed acoustic sensor, that comprises a sampling detector configured to temporally oversample to acquire, in use, a plurality of samples for a sensing portion of interest and a processor configured to process said samples in separate diversity channels and to combine the result from said channels based on the similarity the resulting data from the processed channels.

An aspect of the invention also relates to the use of interrogating radiation comprising two, pulses separated by a gap which is greater than the pulse width, in a distributed fibre optic sensor to allow the acquisition of a plurality of largely independent diversity samples. Thus in another general aspect there is provide a distributed fibre optic sensor apparatus comprising an optical source configured to, in use, repeatedly launch interrogating radiation into an optical fibre wherein the interrogating radiation comprises a first pulse followed a second pulse, wherein the time period between the first and second pulses is greater than the pulse duration of the first and/or second pulse and further comprising a sampling detector configured to acquire, in use, a plurality of samples in a duration equal to the time between the pulses.

DESCRIPTION OF THE DRAWINGS

The invention will now be described by way of example only with reference to the following drawings, of which:

FIG. 24 illustrates the returns from launch of a series of pulse pairs such as shown in FIG. 9a.

DESCRIPTION OF THE INVENTION

Figure 1:
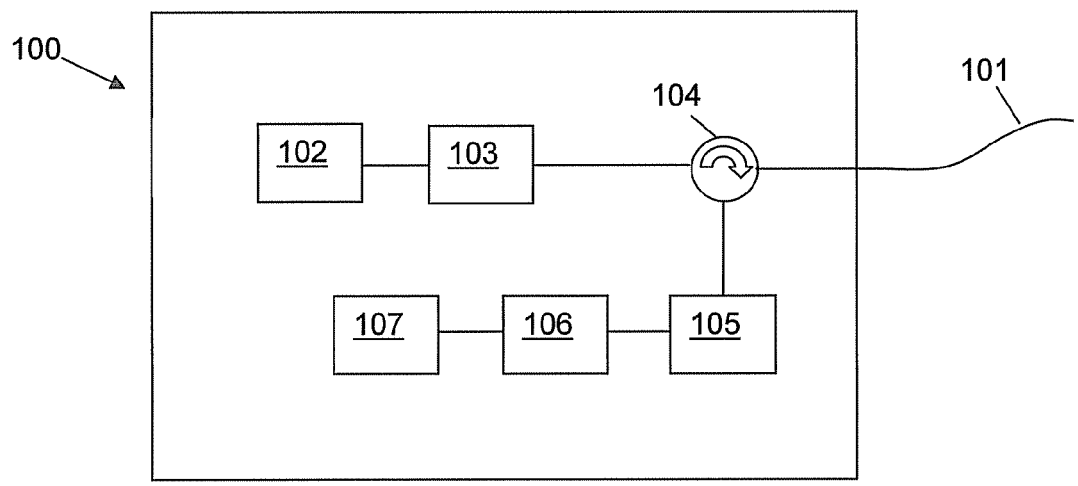
FIG. 1 illustrates the general components of a distributed acoustic sensor.

The general components of an interrogator unit of a distributed acoustic sensor are illustrated with respect to FIG. 1. In use the interrogator unit 100 is connected to an optical fibre 101 which acts as the sensing fibre. The sensing fibre is coupled to an output/input of the interrogator using conventional fibre optic coupling means. The interrogator unit is arranged to launch pulses of coherent optical radiation into the sensing fibre 101 and to detect any radiation from said pulses which is Rayleigh backscattered within the optical fibre. To generate the optical pulses the interrogator unit 100 comprises at least one laser 102. The output of the laser is received by an optical modulator which generates the pulse configuration as will be described later. The pulses output from the optical modulator 103 are then transmitted into the sensing fibre 101, for instance via a circulator 104.

Any optical radiation which is backscattered from said optical pulses propagating within the sensing fibre is directed to at least one photodetector 105, again for instance via circulator 104. The detector output is sampled by an analogue to digital converter (ADC) 106 and the samples from the ADC are passed to processing circuitry 107 for processing. The processing circuitry 107 processes the detector samples to determine a phase value for each of a plurality of analysis bins, each analysis bins corresponding to a different longitudinal sensing portion of interest of optical fibre. It will be noted that the interrogator unit may comprise various other components such as amplifiers, attenuators, filters etc. but such components have been omitted in FIG. 1 for clarity in explaining the general function of the interrogator.

Figure 2:
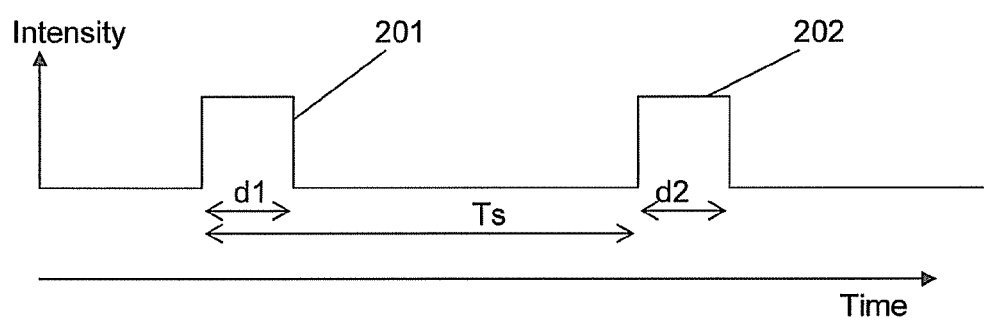
FIG. 2 illustrates an interrogating pulse pair configuration used in embodiments of the preset invention.

In embodiments of the present invention the laser 102 and modulator 103 are configured to produce at least one series of pulse pairs at a particular launch rate. Each pulse pair comprises at least a first pulse and a second pulse and preferably the first and second pulses are separated in time from one another as illustrated in FIG. 2. FIG. 2 shows a first pulse 201 at a first frequency F1 and having a duration d1 followed a short time later by a second pulse 202 having a second frequency F2 and having a second duration d2. In some embodiments the frequencies of the two pulse F1, F2 are equal whereas in other embodiments they are different as will be explained later. Preferably the durations (and hence the spatial widths) of the two pulses d1, d2 are equal to one another although this need not be the case. The two pulses 201, 202 have a separation in time equal to Ts (as shown Ts represents the time separation between the leading edges of the pulses).

When a pulse pair having this type of configuration propagates within the optical fibre some light will be scattered from each of the pulses from the intrinsic scattering sites within the optical fibre. At least some of this backscattered light will be guided back to the beginning of the optical fibre where it can be detected. At any instant the light arriving at the detector may comprise light scattered from the first pulse from a first range of scattering sites and light scattered from the second pulse from a second range of scattering sites.

Figure 3:
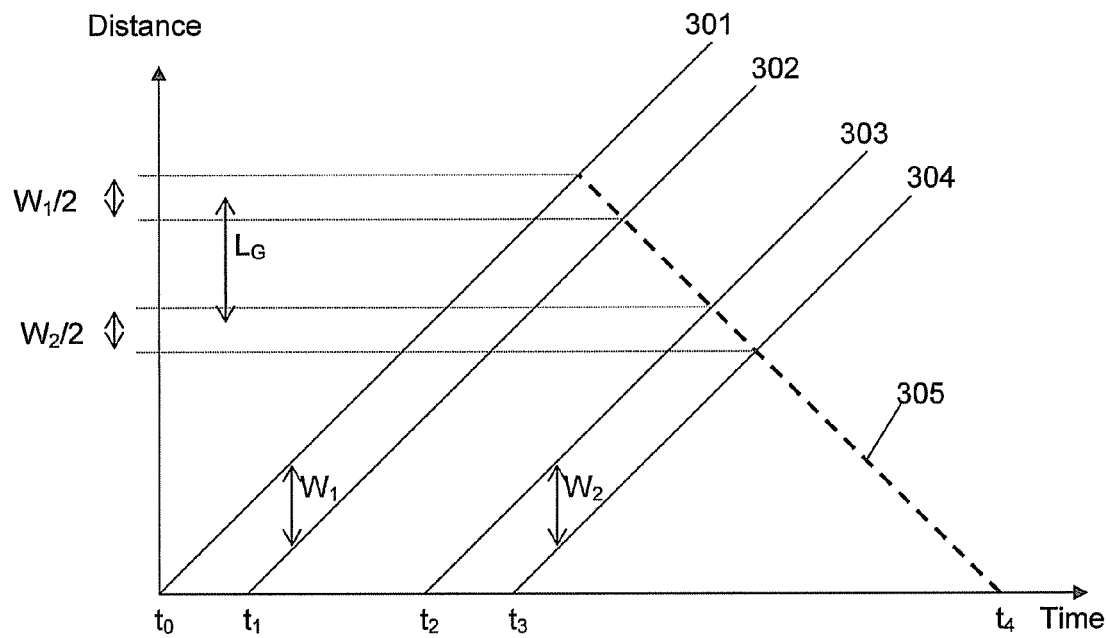
FIG. 3 illustrates how such a pulse pair sets the maximum spatial resolution of the sensor.

FIG. 3 illustrates the propagation of the pulse pair in the optical fibre and shows distance along the fibre against time. Lines 301 and 302 illustrate the leading and trailing edges of the first pulse respectively and lines 303 and 304 the leading and trailing edges of the second pulse respectively. Thus at time $t_0$ the leading edge of the first pulse enters the optical fibre and at $t_1$ the trailing edge of the first pulse enters the fibre. The time between $t_0$ and $t_1$ therefore corresponds to the duration of the first pulse, i.e. d1. At a time $t_2$ the leading edge of the second pulse enters the fibre and at $t_3$ the trailing edge of the second pulse enters the optical fibre. Thus the time between $t_2$ and $t_3$ is equal to the second pulse duration, d2, and the time between $t_0$ and $t_2$ is equal to the pulse separation time, Ts. The pulses propagate in the fibre at a velocity equal to c/n where c is the speed of light and n is the effective refractive index of the optical fibre. Thus the gradient of the lines 301, 302, 303 and 304 are equal to c/n.

This means that in the fibre the first and second pulses will have widths equal to $W_1$ and $W_2$ respectively, represented by the vertical distance between lines 301 and 302 and between lines 303 and 304.

As the pulses propagate in the optical fibre some light will be backscattered towards the start of the fibre. This backscattered light will also travel at a velocity equal to dn. Consider the light reaching the detector. Line 305 represents the trajectory of light which could possibly be received at the start of the optical fibre at instant $t_4$. Any backscattering which occurs at a time and distance into the fibre that lies on line 305 could be received at the start of the fibre at the same instant $t_4$. Thus it can be seen that light from a first section of fibre illuminated by the first pulse at a first range of times will be coincident with light scattered from a second, different, section of fibre at a different range of times. It can also be seen that, as any light scattered from a pulse travels backwards to the start of the optical fibre at the same rate as the pulses themselves propagate forwards, the width of the first section of fibre is equal to half the width of the first pulse in the fibre, i.e. $W_1/2$ and likewise the width of the second section of fibre is equal to half the width of the second pulse in the fibre, i.e. $W_2/2$. Also the physical separation between the first and second sections of fibre is equal to half the physical separation of the pulses in the fibre.

Figure 4:
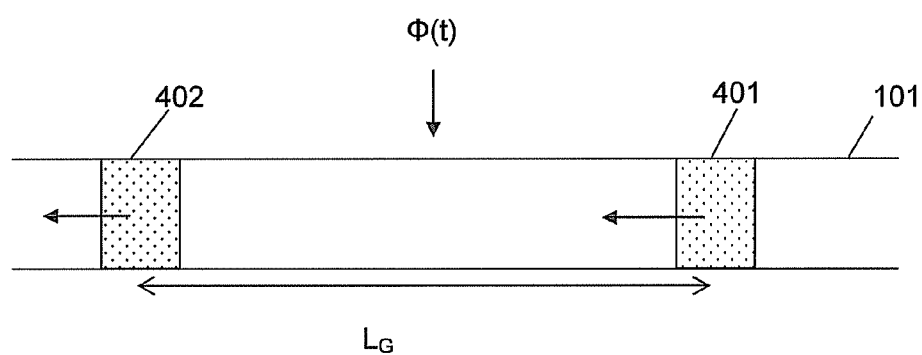
FIG. 4 illustrates the origin of the backscatter signal from within the fibre.

This means that, as illustrated in FIG. 4, at any instance the backscattered light received at the start of the optical fibre corresponds to backscattering in the fibre from a first contributing section 401 of scattering sites illuminated by the first pulse and also from a second contributing section 402 of scattering sites illuminated by the second pulse. The distance between these contributing sections of scattering sites is referred to as the gauge length, $L_G$. As illustrated the gauge length may be measured between the middles of the sections 401 and 402 of scattering sites.

The backscatter signal received at the detector at any instant is therefore an interference signal resulting from the combination of the scattered light from all of these scatter sites. Effectively the backscatter signal at any instant corresponds to signal from a travelling interferometer defined by the positions of the scatter sites within sections 401 and 402. It will be appreciated that the backscatter from all the scatter sites of the second position 402, which will all be at frequency F2, can be considered to interfere to produce a composite signal from the second scatter sites and likewise the backscatter from all the scatter sites of the first section 401, which will all be at frequency F1, can be considered to interfere to produce a composite signal from the first scatter sites. These two composite signals will then also interfere.

The distributed acoustic sensor of the present invention relies on the fact that any acoustic waves incident on the optical fibre may cause a disturbance, e.g. strain, in the optical fibre which can therefore phase modulate the interference signal generated by the travelling interferometer. As will be understood any phase changes occurring on the optical fibre up to the position of the second section 402 of scattering sites will affect the light from the first section 401 and the second section 402 of fibre equally. However any phase modulation $\Phi(t)$ on the section of fibre between the first section 401 and second section 402 will affect the light from the first section 401 only. This can cause a change in phase of the interference signal. Detecting a phase change in the interference signal from a particular section of fibre can thus be used as an indication of an acoustically induced strain upon the optical fibre and hence as an indication of the acoustic waves incident at that section of fibre.

Embodiments of the present invention ensure that the pulse duration and detector and processing arrangements are such that the sensor bandwidth is sufficient to detect all of the frequency components of the backscattered signal in an instantaneous sample. This allows the phase modulated signal to be detected with good signal to noise and good spatial resolution. An analytic version of this signal can be generated in various ways.

In one embodiment the pulse configuration is such that the frequency of the first pulse is different to that of the second pulse, i.e. F1≠F2. This will result in the backscatter interference signal having a component at a carrier frequency equal to the frequency difference between the pulses (|F1−F2|). By monitoring the phase of this carrier frequency any phase modulations due to acoustic disturbances can be detected.

In this embodiment of the invention therefore a series of pulse pairs are launched into the optical fibre, wherein each pulse pair in the series has the same frequency configuration, i.e. a pulse of frequency F1 and duration d1 followed a time Ts later by a pulse of frequency F2 and duration d2. The launch rate of the pulse pairs into the optical fibre (also called the ping rate) is related to the carrier frequency of these pulse pairs so that the time between successive launches is equal to the time taken for a signal at the carrier frequency to evolve by a predetermined phase amount.

This embodiment of the present invention relies on a carrier within the acoustic bandwidth of interest being preserved between successive launches of pulse pairs. Thus a pulse pair is launched into the optical fibre and the backscatter signal received at the detector is sampled at intervals to provide a plurality of channels each corresponding to a different location of scattering sites within the optical fibre. After a certain interval, which corresponds to the time taken for a signal at the carrier frequency to change by a predetermined phase amount, another pulse pair is launched into the optical fibre and another plurality of samples acquired at the same intervals after launch. This is repeated for as long as it is wished to monitor the optical fibre.

For each channel (defined by a certain sampling time after launch of a pulse pair) the successive detector outputs will provide a phase modulated carrier signal at the carrier frequency defined by the frequency difference between the pulses of a pulse pair.

Referring back to FIG. 1 the modulator 103 may therefore comprise an acousto-optic modulator (AOM) for modulating the frequency of the optical radiation generated by the laser 102. As will be understood by one skilled in the art an AOM may be driven by a drive frequency ($F_d$) and in operation shifts the optical frequency of output light by a frequency equal to the drive frequency. Therefore by driving the AOM at a first drive frequency for the duration of the first pulse and at a second different drive frequency for the duration of the second pulse the light in the first pulse will have a different resultant frequency to that of the light in the second pulse and the frequency difference between the pulses will be equal to the frequency difference between the respective drive frequencies used for the AOM. In other words the carrier frequency of the pulse pair can be controlled by controlling the drive frequencies used to drive the AOM. The laser and AOM are phase coherent and so the pulses in each pulse pair have the same properties as if they were derived from two stable sources running at the relevant frequencies.

In one arrangement the carrier frequency is related to the launch rate such that the carrier frequency is less than half the launch rate such that a signal at the carrier frequency can only change in phase by less than 180° between successive launches. In effect this means that the launch-to-launch sample rate for each channel is above the Nyquist limit needed to accurately recreate the signal at the carrier frequency.

In one arrangement the carrier frequency is arranged to be one quarter of the launch rate such that a signal at the carrier frequency evolves by 90° in phase between launch of successive pulse pairs.

Using a phase change of 90° can ease processing as will be described but also allows for efficient use of modulation bandwidth. As the skilled person will appreciate, in the frequency domain any modulation may broaden the spectrum around the signal of interest at the carrier frequency. A similar effect will also be observed around DC and also at the image frequency (twice the carrier frequency). By ensuring that the carrier signal is at half the Nyquist limit the available bandwidth before crossover with the DC component or image frequency component is maximised.

Figure 5:
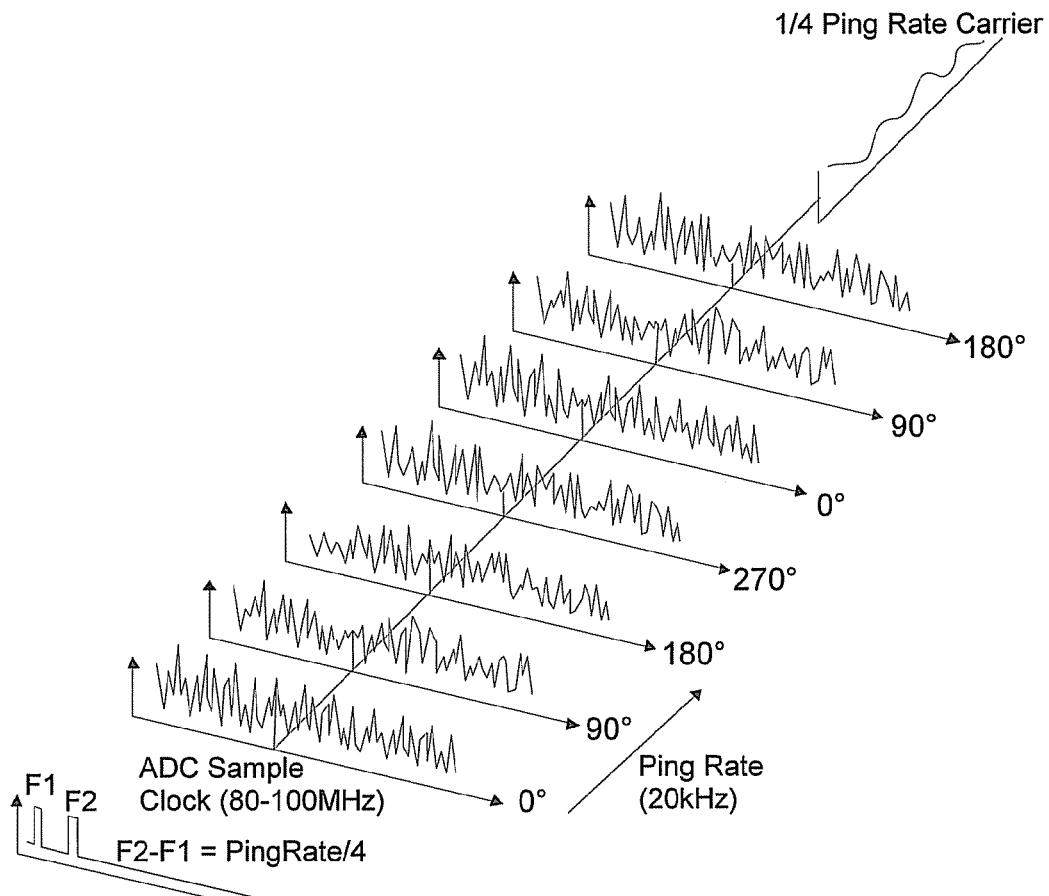
FIG. 5 illustrates the returns from launch of a series of pulse pairs according to an embodiment of the invention.

FIG. 5 illustrates how this embodiment of the invention operates. FIG. 5 illustrates the sampled detector output from a series of successive launches of a pulse pair having the frequency configuration as described above wherein the frequency difference between the pulses in the pair is equal to a quarter of the ping rate, i.e. launch rate of the pulse pairs. In the example shown the ping rate is 20 kHz, which may be a typical ping rate used with a length of optical fibre of the order of 5 km in length or less so as to ensure that only one pulse pair is propagating within the fibre at any one time.

Thus, in this example pulse pairs are launched into the optical fibre every 50 µs and the backscatter return signal generated by the pulse pair as it propagates through the fibre is detected. Following every launch of a pulse pair the detector output is sampled at a relatively high rate, for instance of the order of 80-100 MHz, to detect the backscatter signal from a plurality of different locations within the fibre. In this sample clock domain the random phase variations of the scatter sites lead to a random variation in intensity which destroys the carrier frequency and no useable signal may be detected.

However, at any given position in the optical fibre, a variation in intensity may still be observed at the carrier frequency from launch to launch. Thus by comparing the backscatter interference signal from the same section of optical fibre from different pulse pairs a carrier signal may be detected. FIG. 5 illustrates that by taking the appropriate sample acquired the same time after launch of each pulse pair a carrier signal at frequency equal to one quarter of the launch rate may be detected. This carrier signal will be phase modulated by any acoustic signals affecting the relevant section of fibre as described above and thus by monitoring the phase of this carrier signal over time any acoustic signals incident on the relevant section of optical fibre can be detected.

Figure 6:
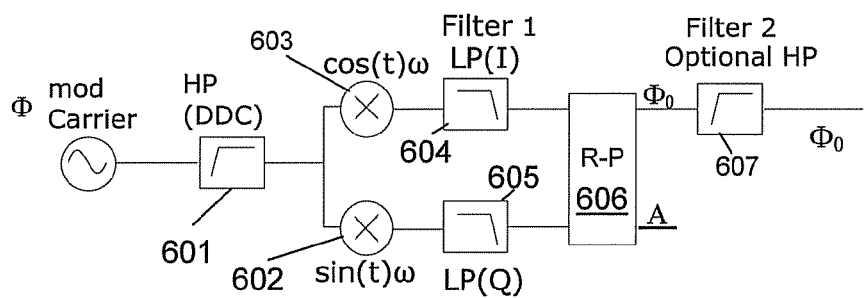
FIG. 6 illustrates one embodiment of processing of the detected signal for a sensor channel.

FIG. 6 illustrates one embodiment of how this modulated carrier signal may be processed by processing circuitry 107 to determine the phase of the carrier signal for a single channel. The samples representing the modulated carrier signal for one channel of the sensor may be high pass filtered 601 to pass the signal at the relevant carrier frequency only. The filtered signal may then be divided into two processing channels and the signals in each channel may be multiplied by sine 602 and cosine 603 functions at the carrier frequency in order to generate In-phase (I) and quadrature (Q) components as is known in complex demodulation schemes. Where the known phase difference is 90° this simply comprises multiplying by +1 and −1. The resultant I and Q signals may then be low pass filtered 604 and 605 and converted to a phase value by rectangular to polar (RP) conversion 606. The RP conversion may optionally also generate an amplitude value. The phase value produced, $\Phi_0$, may optionally be high pass filtered 607.

Thus, using the samples acquired for each channel from successive launches of a series of pulse pairs, a phase modulated carrier signal can be detected and demodulated and thus any phase changes induced by acoustic signals acting on the relevant section of optical fibre can be detected.

It will be understood that as each pulse pair in the series of pulse pairs has the same frequency configuration, that is a first pulse at a frequency F1 and a second pulse at a frequency F2, then if the backscatter signal from two different pulses pairs was incident on a detector at the same time the backscatter signals would interfere with another at the relevant carrier frequency. Hence the launch rate of the pulse pairs may be limited so as to ensure that radiation from only one pulse pair is present in the optical fibre at any one time. Thus the time between launches should be sufficient to allow all the radiation from the pulse pair to reach the end of the optical fibre and any radiation reflected or scattered from the end of the optical fibre to be reach the detector before another pulse pair is launched. The maximum launch rate of the pulse pairs may therefore be limited by the length of the optical fibre. An optical fibre having a length of the order of 5 km may operate with a launch rate up to about 20 kHz (assuming a refractive index of about 1.48). An optical fibre having a length of the order of 40 km may require the launch rate to be lower than 2.5 kHz. Where a much longer length of optical fibre is used there may be a maximum range into the fibre from which backscatter signals may be detected and in this case it may be possible to launch pulses at a rate that allows time for radiation from each pulse pair to reach this point of maximum range and return to the detector between successive launches. After this time from launch although there may still be some radiation from the original pulse pair in the optical fibre any such scattered radiation which reaches the detector will be insignificant.

In one embodiment however the overall launch rate of pulse pairs can be increased by using polarisation to discriminate between successive pulse pairs. In this embodiment one pulse pair is launched into the fibre at first polarisation state. The next pulse pair is launched into the optical fibre with a second, different polarisation state. The first and second polarisation states are chosen such that the backscatter signal from the first pulse pair is received at the detector with a polarisation state which is orthogonal to the polarisation state of the backscatter signal from the second pulse pair. In this way the relevant backscatter signals can be separated by using polarisation sensitive elements.

Figure 7:
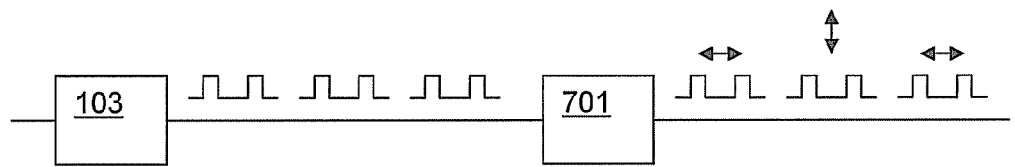
FIG. 7 illustrates an embodiment for producing pulse pairs having different polarisation states.

Thus the optical path for generating the interrogating pulses may comprise a variable polariser element as shown in FIG. 7. FIG. 7 shows that a series of pulse pairs may be output from modulator 103, which may as described above comprise an AOM, and incident on a variable polariser element 701. Variable polariser element acts on the pulse pairs to ensure that all light comprising a pulse pair is polarised to one polarisation state and ensures that successive pulse pairs have different polarisation states. In the example shown the polarisation states are orthogonal linear polarisation states, such as vertical and horizontal polarisations, although any orthogonal polarisation states, such as right and left circular polarisations, may be used instead.

Figure 8:
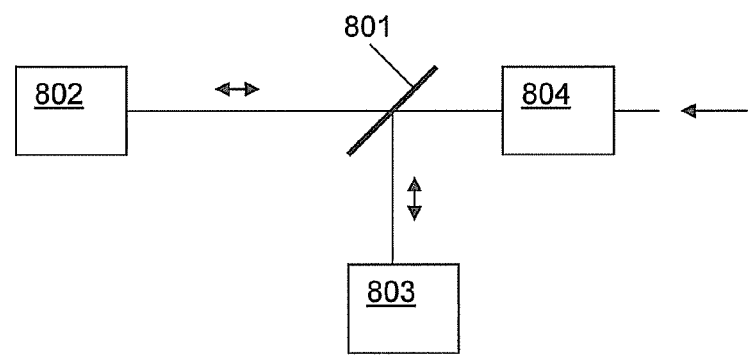
FIG. 8 illustrates an embodiment of a detector arrangement for independently detecting the backscatter signal from pulse pairs of different polarisation states.

FIG. 8 illustrates one embodiment of a detector arrangement that could then used to discriminate between the backscatter signals. Backscatter light received from the optical fibre is directed toward a polarisation element 801 which, in this example is a polarisation dependent beam splitter. This beamsplitter 801 directs light having one polarisation state, say horizontally polarised, to a first detector 802 and light having an orthogonal polarisation state, vertically polarised, to a different detector 803. Thus each detector receives light of a single polarisation state only and hence light backscattered from one of the pulse pairs only. Thus the signal from each detector can be processed as discussed above to generate a series of phase values from each pulse pair independent of the other pulse pair.

It will be appreciated that this technique relies on the input polarisation difference between the pulse pairs being maintained within the optical fibre. In conventional optical fibre the input polarisation difference will be maintained for a certain range in the fibre. Further any factors resulting in change in polarisation in the fibre may affect both polarisation states. Thus the detector arrangement may comprise a polarisation modulator 804 to compensate for any general polarisation drift that occurs within the optical fibre. The polarisation modulator may be adjusted in use to match any changes in polarisation drift, for instance by periodically illuminating the optical fibre only with light of a known polarisation and detecting the response at both detectors. Alternatively a polarisation modulator could be included in the output optical arrangement to apply pre-compensation to the pulses launched into the optical fibre.

Instead of using a polarising beam splitter and two detectors element 801 could comprise a variable polariser element which transmits light to a single detector (say detector 801) but which rapidly varies the polarisation between the two orthogonal states. Thus the detector 802 could be arranged to take one sample at horizontal polarisation say and then another sample at vertical polarisation. Processing could therefore separate every other sample into a different stream from appropriate processing based on the time of launch of the appropriate pulse pair.

In another embodiment, instead of using two pulses at different frequencies, the pulses of the pulse pair may be at the same frequency as one another. In this embodiment F1=F2. However the pulse pairs are generated such that the phase difference between pulses in the pair vary by a predetermined amount between successive pulse pairs.

Figure 9:
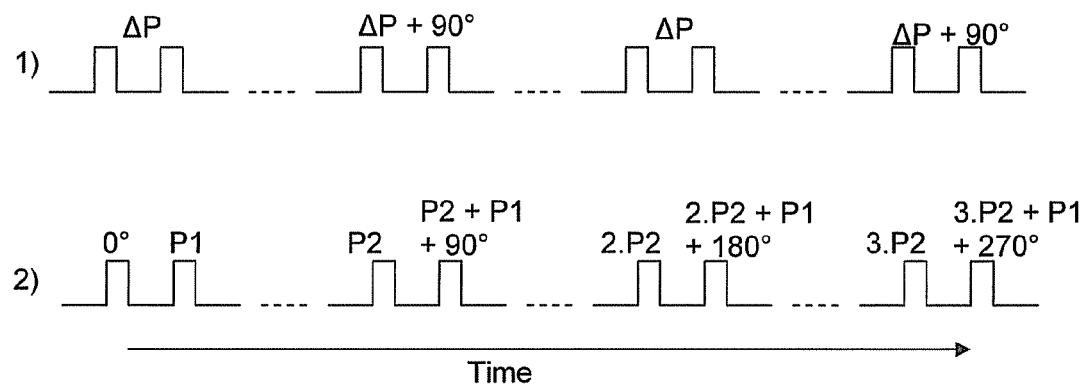
FIG. 9 illustrates two examples of series of pulse pairs used in another embodiment of the invention.

FIG. 9 illustrates some examples of series of pulse pairs that may be generated according to this embodiment of the invention. Four pulse pairs in each series are shown, each comprising two pulses at the same frequency (F1=F2).

Series (1) shows a first example of a series of pulse pairs. In a first pulse pair there is a relative phase difference of $\Delta P$ between the pulses in that pair. This will be an arbitrary phase difference that may arise because of the arrangement of the optical components used to generate the pulse pair. In some arrangements the two pulses of the first pulse pair may be in phase and thus the value of $\Delta P$ may be zero.

In the next pulse pair the phase difference between the pulses in the pair is controlled to vary by a predetermined amount from that of the previous pulse pair, in this example 90° (although other amounts of phase variation may be used if preferred). In other words the phase difference between the pulses in the second pulse pair is equal to $\Delta P+90°$. In the third pulse pair the phase difference between the pulses in the pair is again controlled to be AP and in the fourth pulse pair the phase difference is again ΔP+90°. In this way there is a relative phase difference between successive pulse pairs of 90°.

This variation in phase difference between the pulse pairs will result in a variation in the backscatter interference signal from a given section of optical fibre that can be used to determine a phase value for the relevant section of fibre. Referring back to FIG. 4 it will be recalled that the backscatter signal received at the detector at any instant is the combined signal from a range of scatter sites from a first section of optical fibre 401 illuminated by the first pulse and a range of scatter sites from a second section 402 illuminated by the second pulse. As mentioned above the returns from all of the scatter sites of the first section 401 will interfere together, as will the returns from all the scatter sites of the second section. For the purposes of explanation however consider a single (first) scatter site from the first section 401 and a single (second) scatter site from the second section 402.

The phase of light reaching the detector from the second scatter site will depend on the initial phase of the light of the second pulse of the pulse pair and the effective path length to the second scatter site and back to the detector. The phase of light reaching the detector from the first scatter site will depend on the initial phase of the light of the first pulse of the pulse pair and the effective path length to the first scatter site and back to the detector. The path length to and from the first scatter site is equal to the path length to and from the second scatter site plus the additional path length from the second scatter site to the first scatter sight and back again. Thus the difference in phase between the signal scattered from the first and second scatter sites depends on the path length between the scatter sites and any phase difference between the light of the first and second pulses.

If the first and second scatter sites are illuminated by two successive pulse pairs, at a rate sufficient that any path length changes occurring in the optical fibre between successive pulses are very small, then it will be clear that the only factor which influences any change in phase difference of the backscattered signals will be a change in phase difference of the pulses of the pulse pair. Thus if the first pulse pair has an initial phase difference ΔP between the pulses in that pulse pair, this will lead to a certain phase difference (ΔP') in the backscatter signals received at the detector. If the second pulse pair then has a phase difference ΔP+90°, this will lead to a phase difference of ΔP'+90° in the backscattered signals from the first and second scatter sites.

Figure 10:
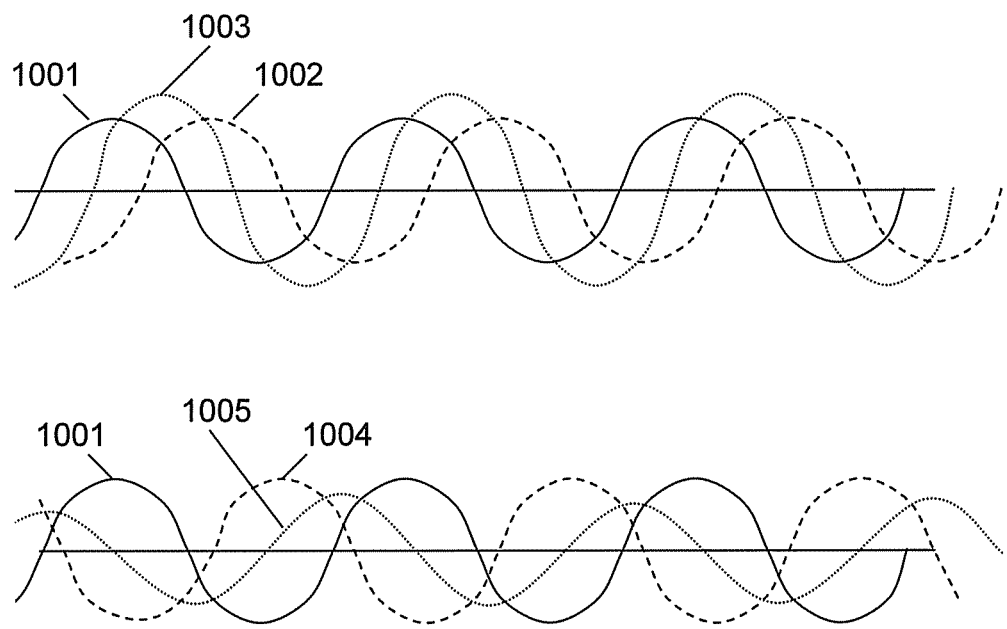
FIG. 10 illustrates the effect of a 90° relative phase change between the pulses in a pulse pair on the signal received at the detector.

As the skilled person will appreciate where two signals of the same frequency interfere with one another the result is a signal of the same frequency but with an amplitude that depends on the phase difference between the interfering signals (and their initial amplitudes) as illustrated in FIG. 10. FIG. 10 illustrates the backscatter signals that may be received from the first and second scatter sites and the resultant interference signal that would be detected. For simplicity the returns from the first and second scatter sites are illustrated with same amplitude although it will be appreciated that this may not actually be the case. The top plot shows the backscatter signals when illuminated with a first pulse pair having a phase difference ΔP between the pulses. Curve 1001 illustrates the signal from the backscatter signal from the first scatter site and curve 1002 the signal from the second backscatter site. There is a certain phase difference between these signals which is determined by the factors mentioned above. Curve 1003 represents the resultant interference signal.

The lower plot shows the backscatter signal when illuminated with a second pulse pair which has a phase difference of ΔP+90° between the pulses. Curve 1001 again shows the backscatter signal from the first scatter site. Curve 1004 shows the backscatter signal from the second scatter site and curve 1005 the resultant interference signal. It will be noted that for ease of comparison curve 1001 is shown in the same phase position in both plots. This of course may not actually happen in practice and there may be an arbitrary phase change. However what is important is the relative phase difference between the backscatter signals from the first and second scatter sites—which is determined solely by the variation in phase change between the pulses in the successive pulse pairs.

The variation in phase difference between the pulses in the first and second pulse pairs leads to a phase variation in the backscattered signal which results in an overall amplitude variation in the resultant interference signal which can be used to determine a phase value for the section of fibre between the first and second scatter sites. Where the phase variation between successive pulse pairs is 90°, as in this example, these interference signals represent In-phase (I) and quadrature (Q) components and low pass filtering of the signals can be used to derive I and Q values which can then be used to derive a phase value through conventional rectangular to polar conversion. Of course other phase values could be used for the variation in phase difference between successive pulse pairs and other conversion techniques used.

The analysis above has focussed on scattering from a single scattering site from each of the first and second sections for ease of explanation. However it will be understood by one skilled in the art that the overall effect is generally the same when considering all the scattering sites together.

Figure 24:
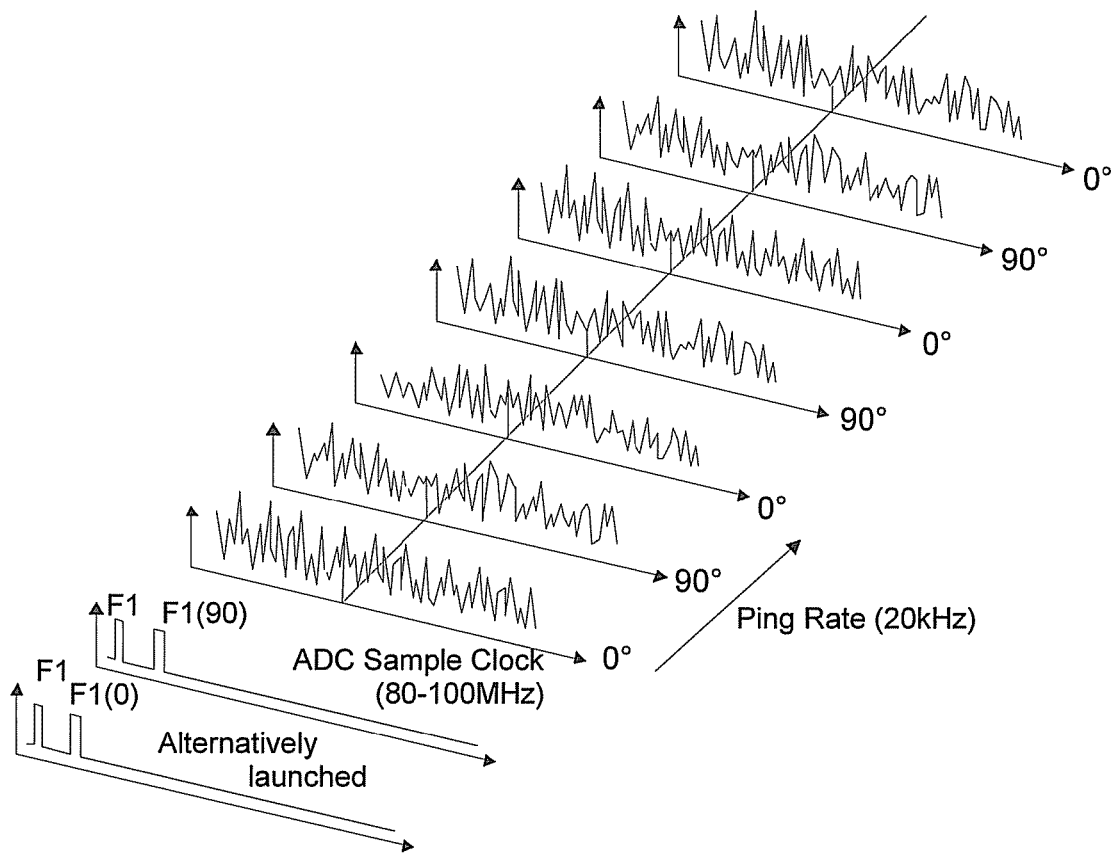

FIG. 24 illustrates how this embodiment of the invention operates. FIG. 24 illustrates the sampled detector output from a series of successive launches of a pulse pairs such as shown in FIG. 9(a) where successive pulse pairs have a phase difference between the pulses of the pair that varies by 90°.

Pulse pairs are launched into the optical fibre at a launch (ping) rate suitable for the sensor, e.g. 20 KHz. The backscatter return signal generated by the pulse pair as it propagates through the fibre is detected. Following every launch of a pulse pair the detector output is sampled at a relatively high rate, for instance of the order of 80-100 MHz, to detect the backscatter signal from a plurality of different locations within the fibre, and to ensure a plurality of samples are acquired for each sensing portion of interest.

At any given position in the optical fibre, there is consequently a 90° phase difference in the relevant measurement signal from launch to launch. The signals from a given section of fibre from launch to launch can therefore be used to determine any phase modulation effecting the fibre by using the successive samples as I and Q signals.

Figure 25:
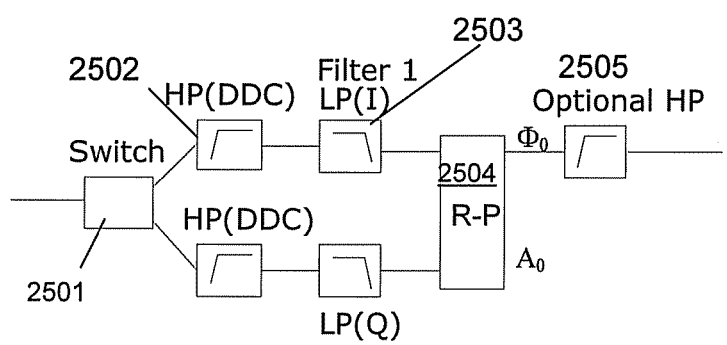
FIG. 25 illustrates one embodiment of processing of the detected signal such as illustrated in FIG. 24 for a sensor channel.

FIG. 25 illustrates one embodiment of how the backscatter signal may be processed by processing circuitry 107 to determine a phase value.

The backscatter samples from a given section of fibre, i.e. a given channel, are received and alternating samples are switched, by switch 2501, into a In-phase (I) and Quadrature (Q) signal paths respectively. In each signal path high pass filter 2502 may remove unwanted signal components and the I and Q signals may then be low pass filtered 2503 and converted to a phase value by rectangular to polar (RP) conversion 2504. The RP conversion may optionally also generate an amplitude value. The phase value produced, $\Phi_0$, may optionally be high pass filtered 2505.

Thus, using the samples acquired for each channel from successive launches of a series of pulse pairs, with an induced variation in phase difference between the pulses of successive pulse pairs, an analytic version of a measurement signal can be recovered and used to derive a phase value such that any phase changes induced by acoustic signals acting on the relevant section of optical fibre can be detected.

Referring back to FIG. 9, the first series of pulse pairs has an alternating phase difference between successive pulse pairs. Series (2) shows an example of an alternative series of pulse pairs where the same relative phase change is applied between successive pulse pairs.

For explanation the relative phase of each pulse will be defined with reference to the phase of the first pulse in the series. Thus the first pulse of the first pulse pair will be taken to have a relative phase of 0°. The second pulse in this first pulse pair will have an arbitrary phase difference, P1, from this first pulse which arises from the arrangement of the optics used to generate the pulses. In some arrangement the phase difference between the first and second pulses in the first pulse pair may be zero, i.e. P1=0°.

For the second pulse pair the first pulse will have another arbitrary phase difference, P2, from the first pulse of the first pulse pair which again may be a function of the optics used to generate the pulses. As the same general optical arrangement is used to generate the pulses in each pulse pair it would be expected that the same phase difference between the pulses, P1, would also exist between the pulse of the second pulse pair.

In the absence of any external modulation (or thermal drift) one may therefore expect the first pulse in each pulse pair to differ in phase from the first pulse of the previous pulse pair by a relative phase difference of P2 and one would also expect a relative phase difference between the pulses of a pair equal to P1.

This embodiment however deliberately introduces a phase difference between the pulses in each pulse pair which varies between successive pulse pairs. In the example shown the phase difference introduced is a positive phase difference of 90°. The first pulse pair is produced with the inherent phase difference between the pulses, i.e. P1. For the second pulse pair however there is a phase modulation applied to the second pulse to introduce an additional 90° phase change. Thus the phase difference between the pulses of the second pulse pair is equal to P1+90°. For the third pulse pair the phase modulation applied to the second pulse is increased by a further 90°. Thus the phase difference between the pulses of the second pulse pair is equal to P1+180°. For the fourth pulse pair the phase modulation is increased by a further 90° so that the phase difference between the pulses of the fourth pulse pair is equal to P1+270°. For a fifth pulse pair, not shown the phase modulation could be reset to 0°.

Thus between each successive pulse pair the phase difference between the pulses of the pair varies by 90°.

It will be appreciated that FIG. 9 illustrates a phase modulation being applied to modulate the phase of the second pulse in each pulse pair but the phase difference could instead by applied to the first pulse in each pulse pair, or both pulses in a pair could be phase modulated to provide the required phase difference.

The phase variation between the pulses could be generated in a number of ways. For instance referring back to FIG. 1 modulator 103 could comprise an electro-optic modulator (EOM) such as a pockels cell or liquid crystal electro-optic modulator to apply a controlled phase variation to at least one of the pulses. Modulator 103 may also therefore comprise an intensity modulator for forming the pulses. As an example, for one pulse pair the EOM could be controlled to apply no phase variation to the pulse pair which will therefore be transmitted with any phase difference between the pulses being due to the inherent phase difference of the generation optics. For a subsequent pulse pair the EOM may apply a phase difference to one of the pulses, or to both of the pulses, to generate the required phase difference.

Figure 11:
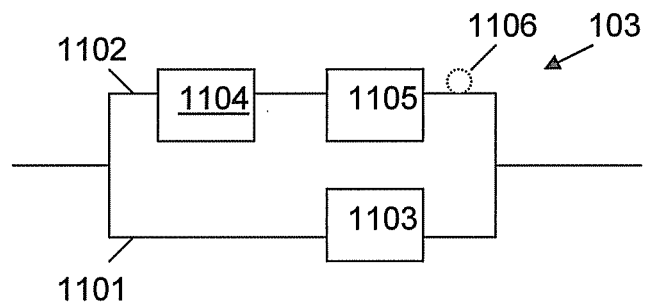
FIG. 11 illustrates an embodiment of a modulator arrangement for generating a controlled phase modulation between the pulses of a pulse pair.

FIG. 11 shows an alternative example of modulator 103. Incoming light is divided into two channels 1101 and 1102 for generating the first and second pulses respectively. Light is channel 1101 is modulated by an intensity modulator 1103 to form the first pulse. Light in channel 1102 is incident on EOM 1104 which applies a required phase modulation (which varies from pulse pair to pulse pair). The phase modulated light is then intensity modulated by intensity modulator 1105. The timing of intensity modulators 1103 and 1104 are controlled so as to provide the required duration of the pulses and also the required time separation between the pulses. Additionally or alternatively a delay 1106 in channel 1102 may provide at least some of the required time separation (although in some embodiments it is preferable that the time separation of the pulses is variable and use of a fixed delay may not be appropriate) The two pulses, having the required phase difference, are then combined to an output line for transmission.

As successive pulse pairs have the same frequency as one another the launch rate of the pulse pairs may be arranged so that radiation for only one pulse pair at a time can reach the detector. Again, as with the embodiment described above, polarisation discrimination may also be used between successive pulse pairs to allow a faster update rate.

Figure 12:
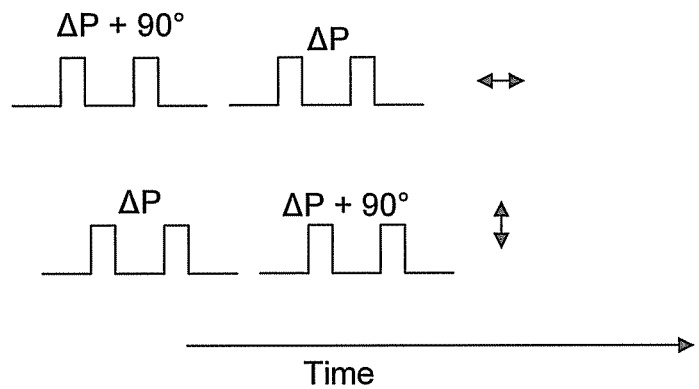
FIG. 12 illustrates two pulse pairs having a variation in phase difference between the pulses being generated simultaneously at different polarisation states.

In another embodiment first and second pulse pairs of a first series having a variation in the phase difference between the pulses in the pair may be launched into the optical fibre simultaneously or near simultaneously with pulse pairs of a second series, with the first and second series having different polarisation states. Thus, as illustrated in FIG. 12 a first series of pulse pairs, with a varying phase difference between the pulses in successive pulse pairs, may be launched into the optical fibre with a horizontal linear polarisation state. At, or near the same time a second series of pulse pairs having with phase variations between the successive pulse pairs may be launched into the optical fibre with a vertical linear polarisation state. The two pulse pairs will therefore propagate down the optical fibre together and will generate backscatter signals from the same sections of optical fibre at the same time. These backscatter signals can be passed independently to different detectors, for instance using a detector arrangement as shown in FIG. 8, to allow for simultaneous or near simultaneous measurements from a given section of fibre. As the backscatter signal exhibits a polarisation dependence such simultaneous or near simultaneous interrogation could help avoid problems with fading as the signals from both series may not fade at the same time.

Figure 13:
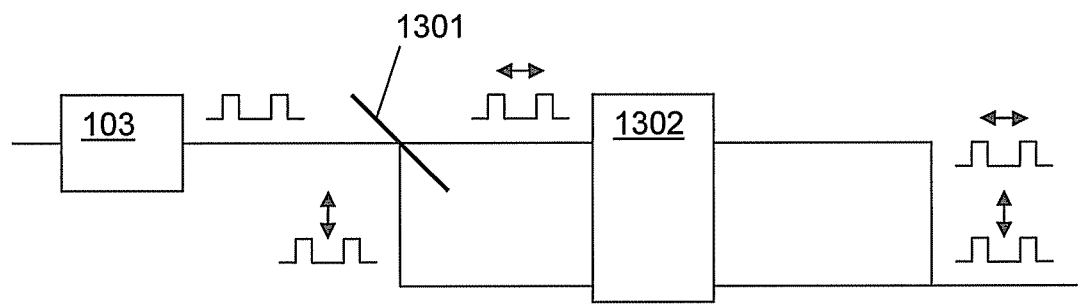
FIG. 13 illustrates one embodiment for generating simultaneous pulse pairs as shown in FIG. 12.

Two pulse pairs having different polarisation state could be produced in a number of different ways. For instance, FIG. 13 shows one possible arrangement where a pulse pair output from intensity modulator 1103 is separated by polarising beam splitter 1301 into horizontally and linearly polarised components into two different channels. Both channels are incident on an EOM 1302 which imposes appropriate phase changes to at least one of the pulses to introduce relative phase differences in successive pulse pairs and the two channels are then recombined so that the pulses are temporally coincident for launching into the optical fibre. When two pulses are coincident however the overall optical power of both pulses should be below the non-linear threshold for the optical fibre and hence, to increase the power available in each pulse the actual pulses may be slightly staggered as illustrated in FIG. 12.

Wavelength division multiplexing techniques can also be used to allow more than one pulse pair to be in the fibre at the same time, for instance to increase the update rate of the sensor and/or to provide different sensor resolution or sensitivity.

It will be appreciated that the techniques described above rely on two different pulse pairs having the same frequency configuration as one another being transmitted into the optical fibre with a predetermined phase relationship between the pulse pairs, either through the timing of launch in relation to a carrier frequency or direct control of the relative phase difference between pulses in the pulse pair. Thus a series of pulse pairs according to embodiments of the present invention should have the same frequency configuration. However wavelength division techniques can be used to launch other series of interrogating pulses into the optical fibre at the same time.

Figure 14:
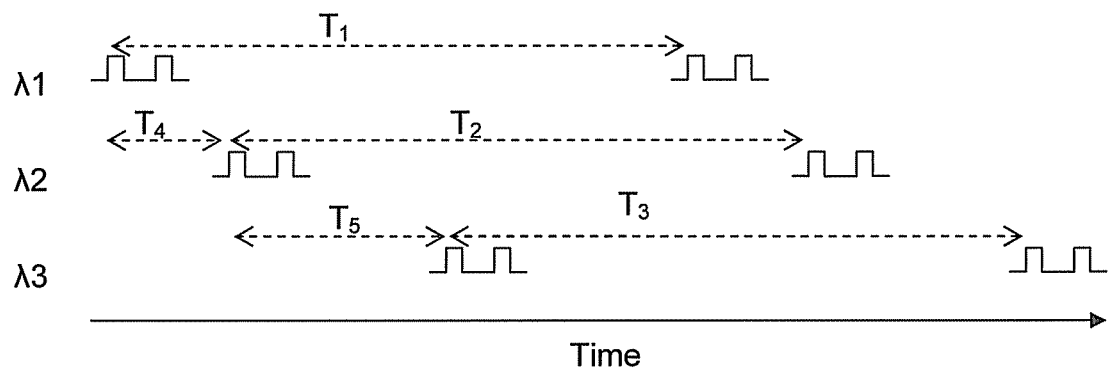
FIG. 14 illustrates different series of pulse pairs being launched at different wavelengths.

FIG. 14 illustrates a series of pulses being launched at different times and at different wavelengths. Thus a first series of pulse pairs may be launched at a first wavelength, $\lambda 1$, with a period $T_1$ between each pulse pair. A second series of pulse pairs may also be launched into the optical fibre at a different wavelength, $\lambda 2$, with a period $T_2$ between each pulse pair in this second series and a third series of pulse pairs may also be launched into the optical fibre at a different wavelength again, $\lambda 3$, with a period $T_3$ between each pulse pair. The time between launches of the pulses in each series need not be the same, i.e. $T_1$ may be different to at least one of $T_2$ and $T_3$ but in some embodiments the launch rate of at least some of the pulse pairs are the same (i.e. $T_1$ may be equal to $T_2$ and/or $T_3$) so that the pulse pairs in the relevant series maintain a certain temporal relationship.

In such an application the relative launch times of pulse pairs may be arranged so that there is a defined time, $T_4$, between launch of a pulse pair of the first series and a pulse pair of the second series and a defined time, $T_5$, between a pulse pair of the second series and one of the third series. The time between launches may be arranged regularly so that, in this example, $T_4=T_5=T_1/3$. If each pulse pair of each series allows a measurement from the same sections of optical fibre this arrangement effectively increases the update rate from each section of fibre by a factor of three as compared to using a single pulse pair. This could be particularly advantageous when monitoring relatively long lengths of optical fibre where the launch rate for a single series of pulse pairs would provide too slow an update rate for the acoustic events of interest.

In another embodiment however the timing of the pulses in each series of pulse pair may be irregularly spaced, i.e. $T_4 \neq T_5$ and both $T_4$ and $T_5$ may be different to the time between a pulse of the third series and a subsequent pulse of the first series. By spacing the timing of the pulse pairs in each series irregularly the time between updates for each sensing portion of fibre also varies. A certain update rate may allow better detection of some event than others. For instance if a certain acoustic event has a frequency equal to a multiple of the update rate of the sensor it may be that each time the relevant sensing portion of fibre is sampled the same return is detected—which may lead to the acoustic signal being missed. However if the relevant section of fibre is sampled at irregular intervals in at least one of the samples the variation due to the acoustic signal will be detectable. Thus the use of irregular spacing may aid in detection of events. Further processing of measurement signals acquired at such irregular interval may be able to provide a synthetic sampling rate higher than that achievable through use of three regularly spaced series of pulse pairs.

One or more of these series of pulse pairs may consist of pulse pairs which comprise pulses at different frequencies to one another with a carrier frequency related to the launch rate as in an embodiment above, in which case the reference to a wavelength for the pulse pair may refer to a base wavelength.

For instance, consider the first series of pulse pairs. A laser may produce light of wavelength $\lambda 1$ (e.g. 1550 nm), which corresponds to a base frequency of $\omega 1$ (about 193.4 THz), which is then modulated by an AOM to provide two pulses of frequency $\omega 1+f1$ and $\omega 1+f2$ respectively (f1 and f2 being the relevant driving frequency for the AO for each pulse). The driving frequencies of the AOM are arranged so that |f1−f2| (i.e. the carrier frequency) is related to the launch rate $(1/T_1)$ to provide the required phase difference in the carrier signal from launch to launch, i.e. for a phase difference of 90° the carrier frequency may be equal to a quarter of the launch rate. Thus the carrier frequency may be of the order of a few kHz.

The second series (and/or third series) may also comprise pulse pairs according to this embodiment, i.e. having pulses with a frequency difference between them related to the launch rate. Where the launch rates for the relevant series are the same this may mean that the carrier frequency for each series of pulse pairs is the same—but the base frequency of the pulses is different. For example, for series two, the base wavelength $\lambda 2$ (e.g. 1530 nm) will corresponds to a base frequency of $\omega 2$ (about 195.9 THz). Light at this base frequency may by modulated by an AOM operated at the same driving frequencies to provide two pulses of frequency $\omega 2+f1$ and $\omega 1+f2$ respectively. The carrier frequency for series two will therefore also be |f1−f2|. Of course if different launch rates were used for the different series the carrier frequency for each series may also vary accordingly.

It will be noted that even though the pulses of the series of pulse pairs are modulated to a different frequency from the base frequency this modulation is relatively small compared to the frequency separation employed in wavelength division multiplexing schemes (for example the wavelengths 1550 nm and 1530 nm discussed above lead to base frequencies of 193.4 THz and 195.9 THz respectively). Thus the different wavelengths typically used even in DWDM (dense wavelength division multiplexing) schemes could be used as the base wavelengths for the different series of pulse pairs and still allow separation of the backscatter signals from each series of pulse pairs.

At least one of the series of pulse pairs may also comprise pulses of the same frequency but having a variation in the phase difference between each of the pulses as discussed above in relation to FIG. 9. Additionally or alternatively at least one series of pulse pairs could comprise a series of simultaneous launches of two pulses pairs at different polarisations and having a variation in the phase difference between the pulses, i.e. a series of launches of pulse pairs as shown in FIG. 12.

It will be noted that whilst the discussion above has focussed on pulse pairs being launched into the optical fibre there may be other pulse configurations launched into the optical fibre as well. For instance a series of single pulses could be launched into the optical fibre at a different wavelength to a series of pulse pairs.

As mentioned the use of multiple series of pulse pairs can be used to provide a faster update rate than would be possible using a single pulse pair alone. Additionally however the use of multiple pulse pairs may be used to provide sensing at different spatial resolutions and/or sensitivity.

Referring back to FIGS. 3 and 4 it will be recalled that when interrogating the optical fibre using a pulse pair comprising temporally distinct first and second pulses the backscatter signal received at the detector at any instant is that received from a first section of fibre 401 illuminated by the first pulse and from a second section 402 of fibre illuminated by the second pulse. Each of these sections of optical fibre is equal in width to half of the relevant pulse width and the separation of (the leading edges of) the sections, referred to as the gauge length, is equal to half the time separation of the interrogating pulses.

As mentioned previously any strain on the optical fibre that affects the fibre between the first and second sections of optical fibre will therefore lead to a detectable change in phase. It will also be appreciated that a change in path length occurring within either of the first or second sections of fibre 401 and 402 will result in a change of phase of the backscatter signal from at least some of the scattering sites. Thus any acoustically induced phase changes occurring within the area of the first and second sections 401 and 402 may be detectable (with a varying degree of sensitivity). Thus the maximum achievable spatial resolution of the distributed acoustic sensor depends on the separation of the pulses and also on the width of the pulses used.

The configuration of the pulse structure also impacts on other aspects of system performance however. For instance the relative width of the pulses can influence the signal to noise ratio of the sensor and also the effective length of sensing fibre that can be reliably monitored.

For a distributed acoustic sensor based on Rayleigh backscatter it is desirable to avoid non-linear optical effects within the optical fibre. This means typically that for a particular length of optical fibre there is a maximum power threshold, or in other words a limit to the intensity of the radiation of the pulses. The amount of backscatter received at any time is related to the intensity of the pulses but also to the width of the pulses. Simplistically speaking the more photons within a pulse the greater the amount of backscatter and if the intensity is capped the only way to increase the number of photons is to increase the pulse length. Thus using wider pulses, i.e. longer duration pulses, can improve the signal to noise ratio for any given section of optical fibre.

However using wider pulses can lead to the phase centre of the relevant sections of fibre being less well defined.

Figure 15:
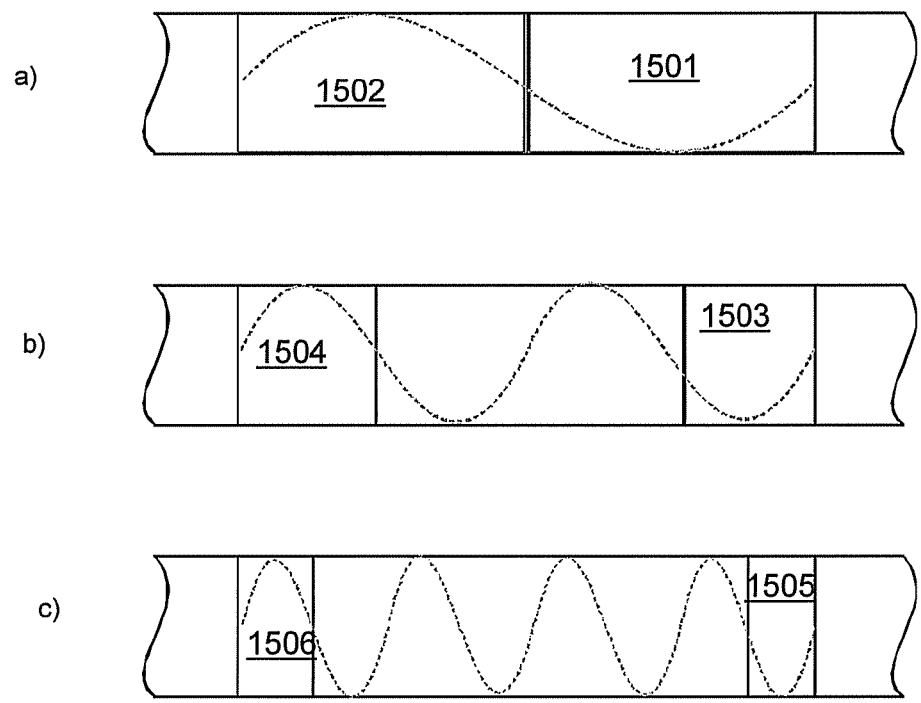
FIG. 15 illustrates three examples of pulse pair configurations.

For example FIG. 15 illustrates three examples of different pulse configurations having pulses of different widths. FIG. 15 shows the scattering sites within the fibre that would contribute to the instantaneous signal arriving at the detector. In each case the time difference between the start of the first pulse and end of the second pulse is the same. Hence, within the fibre, the outer edges of the sections of fibre which may contribute to scattering at any instance are located the same distance apart. As the intensity of the backscatter varies on the scale of the pulse width FIG. 15 also illustrates (dotted line) an idealised maximum intensity variation in terms of spatial length along the fibre.

FIG. 15a shows an example with pulses that immediately follow one another. Hence the sections of fibre 1501 and 1502 from which scattering may occur are also adjacent. FIG. 15b illustrates an example in which the pulses are temporally separated and the pulses are relatively wide compared to the gap between pulses (which leads to a similar configuration of the sections of fibre 1503, 1504 which contribute to the scattering signal at any instant). FIG. 15c shows an example in which the pulses are temporally separated and the width of the pulses is relatively narrow compared to the gap between pulses and hence the sections of fibre 1505 and 1506 (from which scattering from the first and second pulses respectively may be received at the same time) are similarly relatively narrow compared to the gap between them.

The example shown in FIG. 15a would provide the best signal to noise ratio of any of these pulse configurations. However the configuration illustrated with regard to FIG. 15 would have a variable phase centre.

It will be appreciated that scattering may occur from any of the scattering sites within section 1501 when illuminated by the first pulse and likewise scattering may occur from any of the scattering sites within section 1502. As the distribution of scattering sites is effectively random within the optical fibre it is entirely possible that in one section of fibre the distribution of scattering sites is not even throughout the section. The scattering sites may be concentrated in certain areas. Consider a path length variation that occurs at about the middle of section 1501 of optical fibre. Any scattering from within section 1501 that occurs before this disturbance will clearly not experience the path length variation and thus will not lead to a detectable phase change in the interference signal. Any scattering from section that 1501 that occurs after the path length variation clearly have a relative phase difference that may lead to a detectable phase change in the interference signal. If the scattering sites are distributed evenly throughout section 1501 then about half of the scattering from section 1501 will have the relevant phase change. If however the distribution of scattering sites are such that most of the scattering occurs before the position of the disturbance then the majority of scattering from section 1501 may not exhibit the relevant phase change and the sensitivity to such a disturbance is therefore relatively low. Thus a pulse configuration of the type illustrated with reference to FIG. 15 will tend to have a sensitivity that varies greatly based on the distribution of scattering sites.

The pulse configuration used in the example shown in FIG. 15b has a reduced SNR compared to that of FIG. 15a but has a better defined phase centre. The pulse configuration used in the example shown in FIG. 15c has a further reduced SNR but even better defined phase centre.

In addition the pulse configuration example illustrated in FIG. 15c, and to a lesser extent FIG. 15b, provides opportunity for multiple diversity samples to be acquired which can reduce the problem of fading.

Referring back to FIG. 4 it will be recalled that the signal received at the detector at any instant is the result of the interference of all the scattered light from section 401 of the fibre and from section 402 of the fibre. As mentioned previously one can effectively consider all the scattering from section 401 interfering to provide a composite signal at frequency F1 and all the scattering from section 402 interfering to provide a composite signal at frequency F2. It will be appreciated that as the scattering sites are effectively randomly distributed there is a finite chance that at any location in the optical fibre the scattering from either section 401 or section 402 destructively interferes so that no, or only a very low intensity, composite signal is produced. In this event, there will be no appreciable interference with the composite signal from the other section and it will not be possible to determine any phase variations at that position in the optical fibre—the signal has faded.

Embodiments of the present invention overcome the problem of fading by using a pulse configuration that comprises temporally separated pulses wherein the gap between the pulses is equal to or greater than the pulse width (of at least the second pulse), i.e. by using a pulse pair of the type illustrated with reference to FIGS. 15b and 15c.

Figure 16:
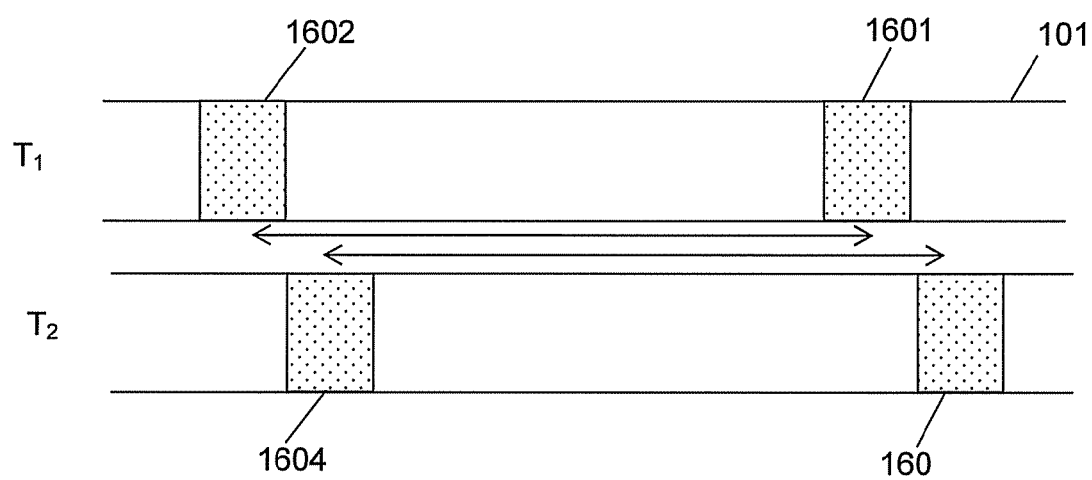
FIG. 16 illustrates the principle of temporal oversampling to generate spatial diversity samples.
Figure 17:
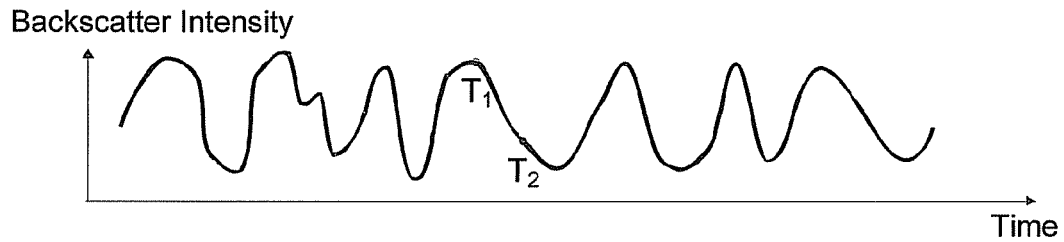
FIG. 17 illustrates an example backscatter intensity signal against sampling time for a single pulse pair.

Consider how the backscatter signal generated by such a pulse pair changes as the pulses propagate through the optical fibre. FIG. 16 shows that at a first sample time, $T_1$, the signal received at the detector is due to the scattering from a first section 1601 of fibre illuminated by the first pulse and a second section 1602 illuminated by the second pulse. At a second sample time, $T_2$, the signal at the detector will be due to a third section of fibre 1603 illuminated by the first pulse and a fourth section 1604 of fibre illuminated by the second pulse. If the sample time between $T_1$ and $T_2$ is equal to or greater than half the duration of an individual pulse then the sections of fibre 1602 and 1603 illuminated by the first pulse at the different sampling times will be different (i.e. there will be no overlap). Likewise the sections 1602 and 1604 of fibre illuminated by the second pulse will also be completely different. As the scattering from these different sections of fibre are uncorrelated, the effective bias position of the interferometer formed by the pulses are also uncorrelated. The backscatter signal intensity (from a single pulse pair travelling through the optical fibre) will therefore vary over a temporal length of the order of half of the pulse length, i.e. of the order of the width of the sections of scattering sites within the optical fibre. FIG. 17 illustrates the backscatter intensity pattern and how the intensity may therefore vary between the two sample times, $T_1$ and $T_2$. Thus the samples acquired at the different sample times can be seen as diversity samples.

In effect at each different sample time the phase bias position of the interferometer defined by the scattering sites varies. FIG. 18 shows an illustrative curve 1801 of backscatter signal intensity against phase bias position—when the scattering sites define a interferometer with zero phase bias, i.e. the backscatter signals are in phase, the intensity is at a maximum and when the phase bias position is ±180°, i.e. the signals are out of phase, the intensity is at a minimum.

Figure 18A:
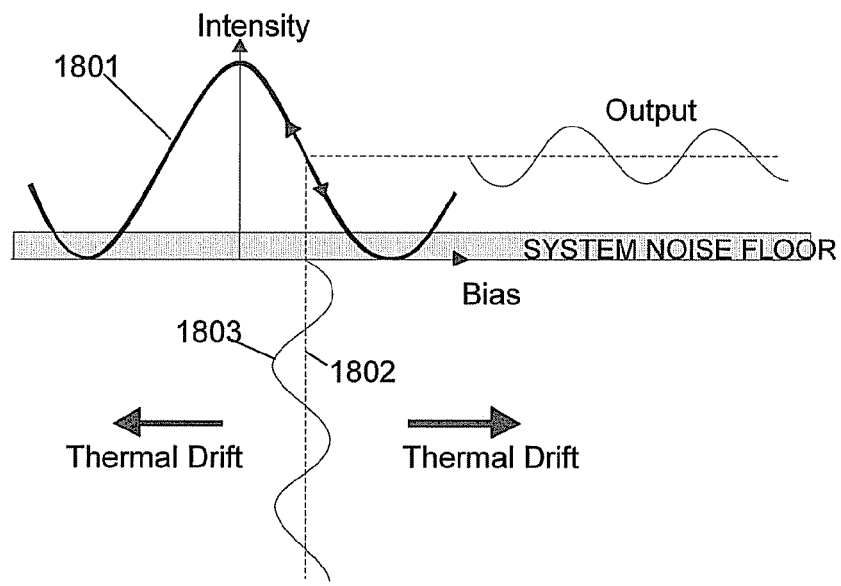
FIGS. 18a and 18b illustrate how spatial diversity samples can avoid the problem of fading.
Figure 18B:
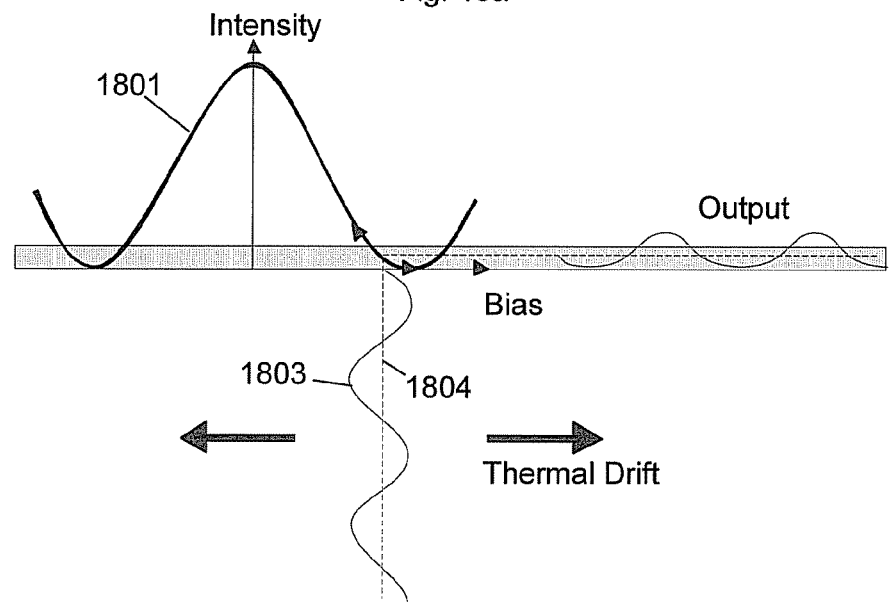

FIG. 18a illustrates the phase bias position 1802 at the first sample time, $T_1$. The distribution of scattering sites at sections 1601 and 1602 of fibre will determine the relevant phase bias position. FIG. 18b illustrates the phase bias position 1804 at the second sample time, $T_2$.

Ignoring thermal drift for a moment, for each successive launch of pulse pairs a sample acquired at the same sample time, i.e. $T_1$ or $T_2$ after launch (which will be referred to as a channel) will give rise to the same phase bias position. Thus, in the absence of any other modulation the same general intensity of backscatter signal will be detected in each channel from successive launches. Any acoustically induced phase modulation 1803 will however vary the phase bias position of the output signal and will lead to a variation in output intensity in the channel which can be detected. The example shown in FIG. 18a shows a phase bias position that leads to a intensity modulation that would be readily detectable. However, for the example shown in FIG. 18b the channel corresponds to a phase bias position that leads to a low intensity signal. FIG. 18 also illustrates the noise floor of the sensor. The skilled person will appreciate that there will be a certain noise floor, defined by various parameters, which sets the lower signal limit which can reliably be detected. It can be seen that the output signal generated from channel samples acquired at sample time $T_2$ will mainly be masked by the noise floor.

Over time thermal variations will also alter the phase bias position of different channels. This thermal variation is slow on the time scale of the acoustic disturbances being monitored and thus acoustic disturbances can clearly be detected. However thermal variations may result in a change of SNR of an individual channel over time.

Referring back to FIG. 16 it can therefore be seen that, by using a pulse pair configuration with gap between the pulses of the order of the pulse duration or longer, the time between samples can be set so that each successive sample relates to a substantially independent set of scattering sites but the section of fibre defined by the scattering sites in each case largely overlaps. This overlap means that any acoustic signals causing a path length change in the relevant section of optical fibre can be detected from either sample. Thus if diversity samples acquired at one sample time, $T_1$, after launch of each pulse pair (i.e. corresponding to a first channel) happen to have a low SNR due to the phase bias position of the resultant interferometer, the diversity samples from another sample time, $T_2$, (a second channel) may have a better SNR and may be used to determine the acoustic signals affecting that section of fibre.

As illustrated in FIG. 16 a pulse configuration with relatively narrow pulses compared to the gap between pulses may allow a number of different diversity samples to be acquired, each corresponding to substantially independent scattering sites and all of which define portions of fibre which partly overlap. Thus a plurality of diversity samples may be acquired which correspond to a plurality of overlapping spatial sensing portions of optical fibre.

The sample rate of the detector is therefore set at a rate such that a plurality of samples are acquired in the time taken for the pulses to propagate in the optical fibre by a distance equal to the gauge length. This can reduce the problem of fading as compared to acquiring a single sample from a section of fibre equal to the gauge length as clearly the likelihood that all the sample positions have faded is much lower than the probability that an individual sample position has faded. Thus by taking multiple diversity samples within the gauge length the SNR of the sensor is improved.

It will be noted however that such temporal oversampling does not increase the achievable maximum spatial resolution of the distributed acoustic sensor, which as noted above is defined by the pulse pair widths and separation.

The plurality of successive diversity samples may be analysed in various analysis bins, each analysis bins corresponding to a certain defined sensing portion of the optical fibre to provide a single measurement for each analysis bin. In other words consider that the pulse pair configuration is such that the gauge length is, for example, 10 m. This corresponds to a pulse separation of the order of 100 ns. The analysis bins may therefore correspond to contiguous 10 m sections of optical fibre. The sample rate may be such that, for example, 10 or so diversity samples are acquired in the time take for the backscattered radiation reaching the detector to correspond to a different 10 m section of fibre, i.e. twice the time taken for the pulses to move 10 m within the optical fibre (to allow for time for the pulses to move 10 m into the fibre and the light to return that extra 10 m distance). In other words, taking the refractive index of the fibre to be about 1.5 the samples may be acquired at a rate of about 100 Mhz.

In this example each analysis bin may therefore comprise ten channels, each successive channel receiving successive diversity samples acquired following launch of a pulse pair. Each channel therefore corresponds to a 10 m section of fibre with the relevant 10 m section being displaced by 1 m between each channel and each channel will be updated at the launch rate of the pulse pairs. The section of fibre to which the relevant analysis bin pertains may therefore be defined as the 10 m of fibre which is in the middle of length of fibre corresponding to all the channels of the analysis bins. In other words if the first channel of the analysis bin defines a 10 m section of fibre from a position x to x+10 m into the fibre, and the second channel defines a section from x+1 m to x+11 m and so on till the tenth channel defines a position from x+9 m to x+19 m then the analysis bin may be defined to relate to the section of fibre from x+4.5 m to x+14.5 m. It will be apparent that grouping the channels into bins in this way does mean that the any modulation affecting a section of fibre corresponding to one analysis bin will also have an effect in an adjacent analysis bin. This does have an impact on spatial resolution but the advantages of the diversity processing scheme compensate for such reduction in spatial resolution.

The analysis to produce a single measurement value for an analysis bins could be performed in many different ways.

For instance the processing could involve averaging the samples from all the channels forming the analysis bin and using the average sample value to determine a value of phase for the analysis bin.

However in embodiments of the present invention the diversity samples in the individual channels are assessed using a quality metric and the result of the assessment used in combining the samples from the various channels.

In embodiments of the present invention the diversity samples in each channel are processed to determine a phase value for that channel, the resulting phase values for each channel are assessed using a quality metric and then a combined value for the analysis bin is determined.

In this embodiment therefore each channel may be separately processed to determine a phase value for that channel. The phase value may be determined for each channel using standard demodulation techniques. For instance when using pulse pairs according to the embodiment described above in relation to FIG. 5 a demodulation method may be applied to each channel as described with respect to FIG. 6. When using pulse pairs according to the embodiment described with reference to FIG. 9 or 12 the detected signals may, for instance, inherently comprise I and Q components which can be low pass filtered and converted to a phase value through rectangular to polar conversion or otherwise can be converted to I and Q components.

The result of such processing is a phase value, and optionally, an amplitude value, for each channel.

The AC to DC ratio for each channel may be used as an indication of signal to noise ratio for the relevant channel. Thus the phase values for the channels may be combined taking this ratio for the channels into account. A relatively high ratio may indicate a relatively high SNR whereas a low value may represent a low SNR. The derived phase values from channels with an AC to DC ratio value below a threshold may therefore be discarded. Additionally or alternatively the phase values may be given a weighting in forming the combined value with the weighting being, at least partly, based on the AC to DC ratio.

In one embodiment the phase values derived for the channels may be analysed according to a quality metric based on the degree of self similarity of the signals from each channel. For most applications the assumption can be made that, where diversity samples are acquired from overlapping sensing portions of the optical fibre, any acoustic disturbance acting on the fibre at that general location will lead to substantially the same phase modulation in each channel. Thus all processed phase values for all of the channels can be compared to each other to determine how similar the results from each channel are to one another. Channels that exhibit a high degree of similarity can be assumed to be measuring the same stimulus, whereas a channel that is significantly different to the others may effectively be noise dominated.

A quality metric may therefore be applied to the phase values determined for each channel in order to determine the degree of self similarity to the other channels. The phase values may then be combined with an appropriate weighting applied to each phase value based on this quality metric. In other words phase values which are very similar to one another may be given relatively high weightings in the combination whereas phase values which are less similar to one another may be given relatively low weightings in the combination. In this the way the combination gives more weight to good quality samples and less weight to poor quality samples and thus improves the signal to noise ratio compared to conventional combination techniques.

The degree of self similarity of a sample with the other samples may be determined by comparing the phase values determined for a channel with the phase values determined for the other channels. Preferably a relatively simple and straight-forward correlation is used to minimise processing overhead.

In one embodiment a first metric, M1, is used to determine the similarity of the variation of the signals in the channels being compared. The metric M1 applied to the signals A and B from channels A and B may be of the form:

$$M1(A,B)=(A-<A>)\cdot(B-<B>) \quad \text{Eqn. (1)}$$

This metric can give a large result for a signal with a large DC component. Advantageously therefore a second metric, M2, may be used to determine a measurement of the magnitude of the difference between the two signals. The metric M2 may be of the form:

$$M2(A,B)=((A-<A>)-(B-<B>))^2 \quad \text{Eqn. (2)}$$

These two metrics may be calculated for each combination of channels within the analysis bin and used to determine the channels which are most similar to one another. A single overall metric $M_Q$ may be calculated by:

$$M_Q(A,B)=M1(A,B)-M2(A,B) \quad \text{Eqn. (3)}$$

The value of the calculated quality metric $M_Q$ may then be used to determine those channels which are most self similar.

Figure 19:
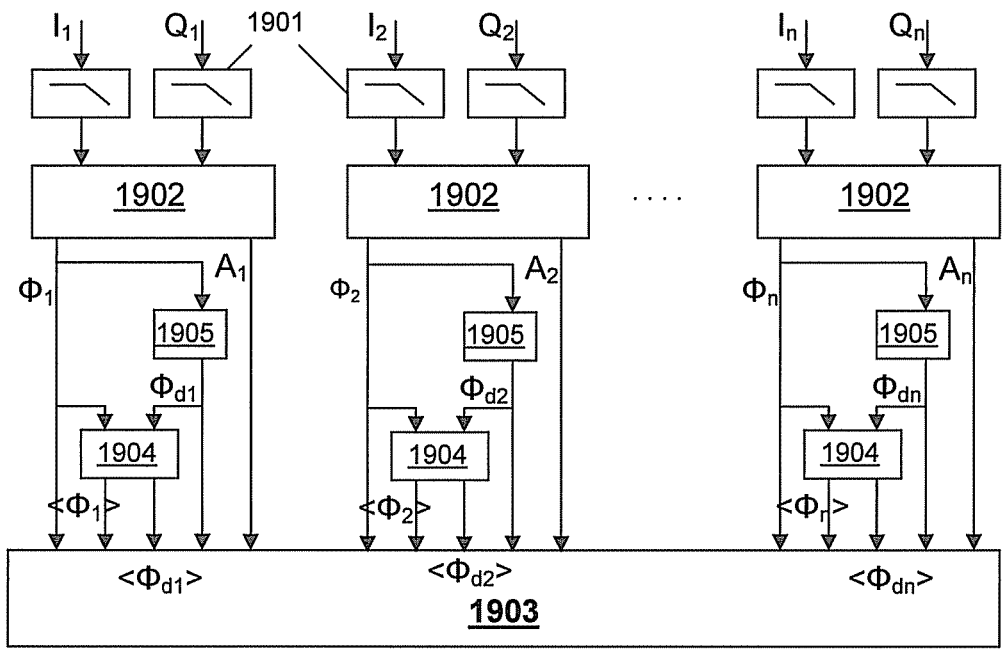
FIG. 19 illustrates the processing a diversity samples in one analysis bin to generate phase values for each channel.
Figure 20:
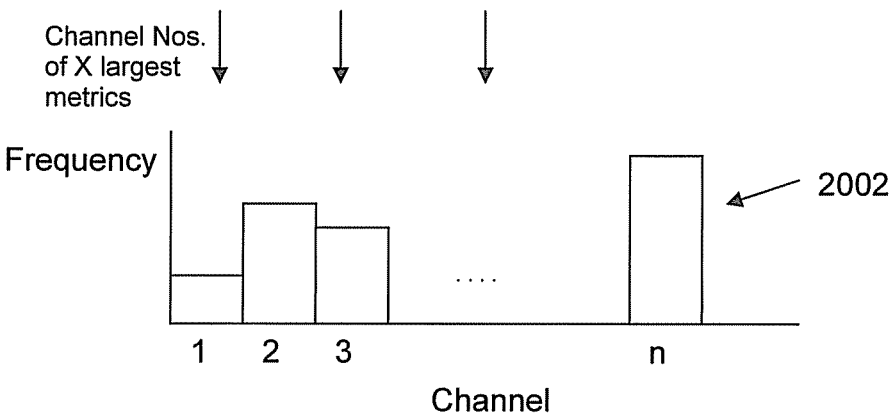
FIG. 20 illustrates how a selected number of channels in an analysis bin may be selected for combination.

FIG. 19 shows one embodiment of how the relevant phase values may be determined for the various channels in an analysis bin.

The I and Q components for each of the n channels in an analysis bin may be received and low pass filtered 1901 to derive I and Q values. These I and Q values may then by converter to a phase value Φ and amplitude value A by rectangular-to-polar conversion 1902. The phase value Φ and amplitude value A from each channel may be used in subsequent processing 1903 to determine self similarity. The phase value Φ for each channel is also passed to a filter 1904 to perform time averaging and produce an average phase value <Φ>. The phase value Φ and average phase value <Φ> for each channel may then be processed to determine the metrics discussed above. Once the channels which are self similar have been identified the phase values from the relevant channels can be combined. However as the metric processing takes some time the phase value Φ for each channel may also be passed to a buffer 1905 as a delay. The delayed phase value $\Phi_d$ can be used as the value to be combined. In one embodiment the combination involves combining the difference between the current and average phase values and hence the delayed phase value $\Phi_d$ may be also filtered 1904 to produce an average which may also be used in the combination. Note that the same filter block 1904 is shown as acting on the phase value and delayed phase value to provide the relevant averages. It will be appreciated however that in practice separate filters may be applied.

In one embodiment the subsequent processing determines a metric for each combination of channels and selects a pre-determined number of channels which are the most self-similar for combination. In other words the method may comprise the step of selecting the m most self-similar channels from the n channels available within the analysis bin. For example if there are 10 channels within the analysis bin, i.e. n=10, then the five most self similar results from the channels (m=5) may be chosen to be combined.

The number of channels which are selected to form the combined phase result may be the same for each analysis bin and may be constant over time. This may ease some of the later processing as each combined phase value is formed from the same number of individual samples. It also will ensure a constant noise floor for the sensor. In one embodiment however the number of channels which are used in the combination is configurable by a user of the interrogator unit.

Figure illustrates one implementation of the metric based processing to select the M most self-similar channels. The phase value $\Phi$ and average phase value $\langle\Phi\rangle$ are received for each channel. For each channel the metric, $M_Q$, is determined for the combination with each other channel to form a matrix 2001 of the metric score. As only the magnitude of the metric is important the metric for each combination of channels need only be calculated once, i.e. the magnitude of metric $M_Q(A, B)$ would be the same as that for $M_Q(B, A)$.

This result, for each channel, in effectively a series of scores for each of the other channels. At this stage a predetermined number, X, of the highest metric scores for a channel may be identified. The corresponding channels for those highest metric scores may be identified and counted, for instance in a histogram type arrangement 2002. Thus for channel 1 say, if the highest X metrics included the metrics from combinations with channels 2, 5 and 6 then the histogram count for channels 2, 5 and 6 would be increased by one. This process can be repeated for all 5 channels. The histogram will then indicate which channels are the most similar to the other channels and the M channels with the highest histogram counts may be selected for combination.

For each selected channel the delayed phase value $\Phi_d$ is used in the combination so that the data being combined is the same data from which the metrics were calculated. In one embodiment the combination is the sum, for each of the selected channel:

$$\Sigma W_i(\Phi_d - \langle\Phi_d\rangle)$$ Eqn. (4)

where $W_i$ is an optional weighting for ith channel. For instance the weighting $W_i$ could be based on the histogram count.

Figure 21:
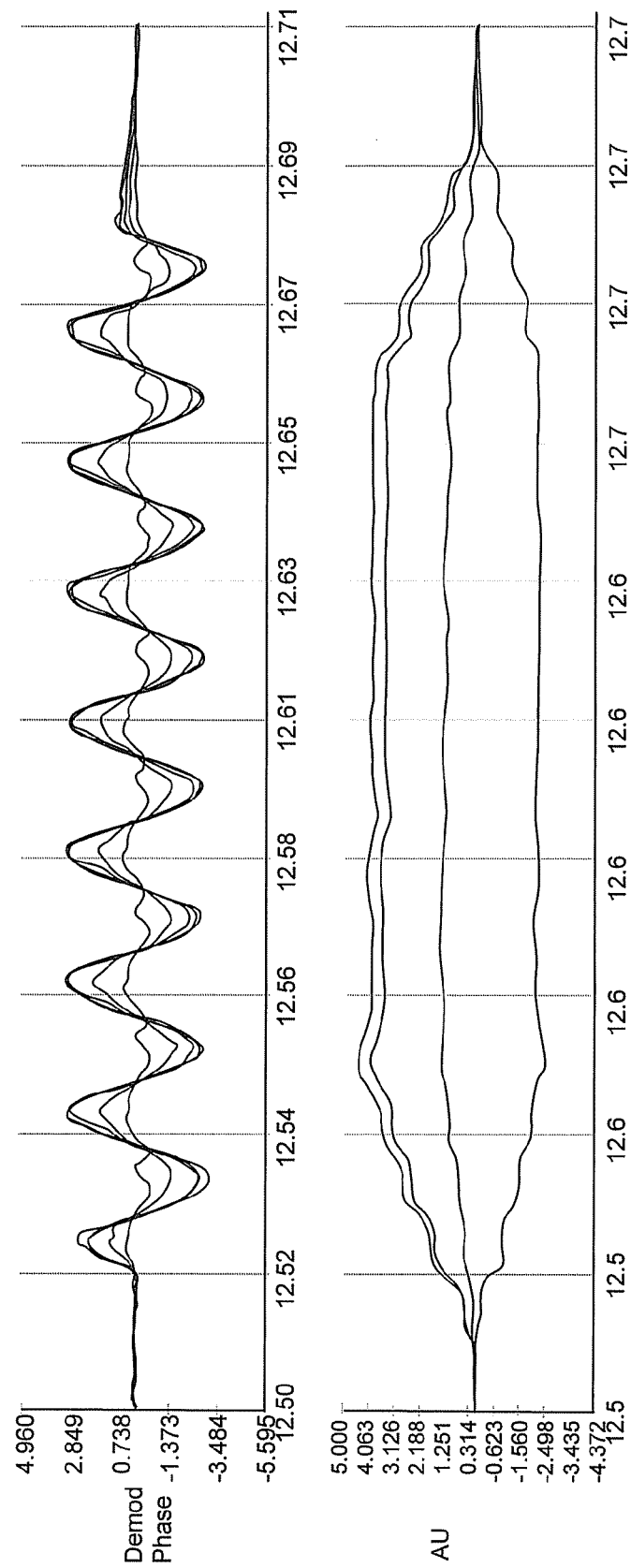
FIG. 21 shows an example of phase values calculated for the channels of an analysis bin and a resulting quality metric determined for similarity of one channel with the other channels.
Figure 22:
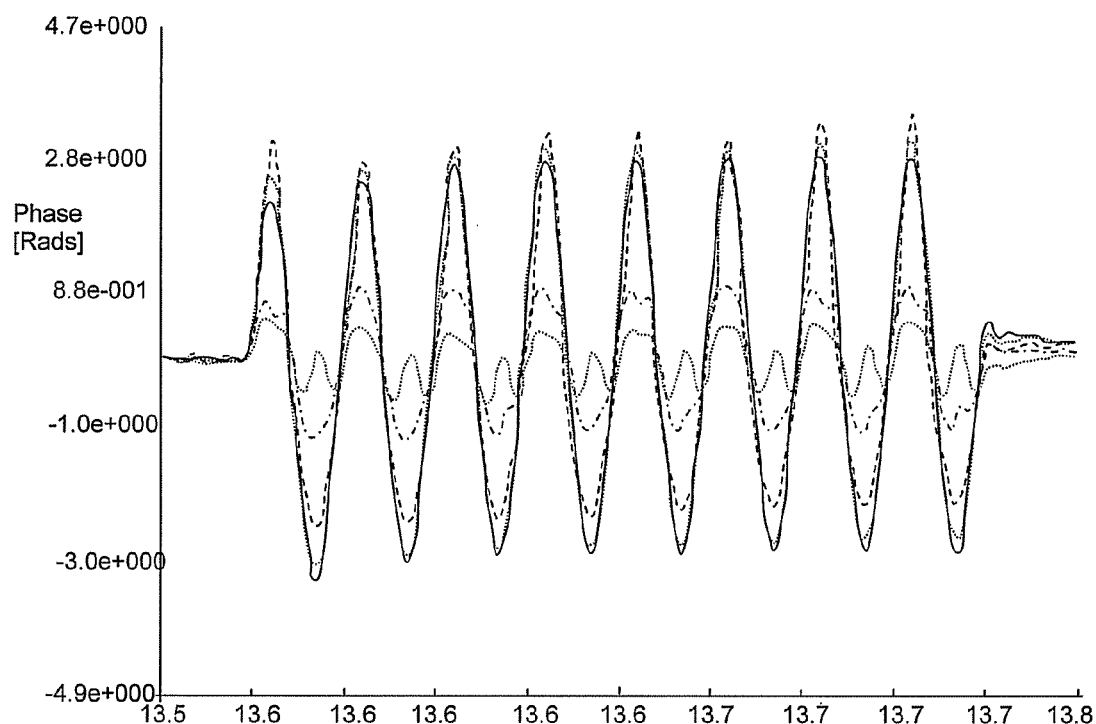
FIG. 22 shows another example of phase values calculated for the channels of an analysis bin.
Figure 23:
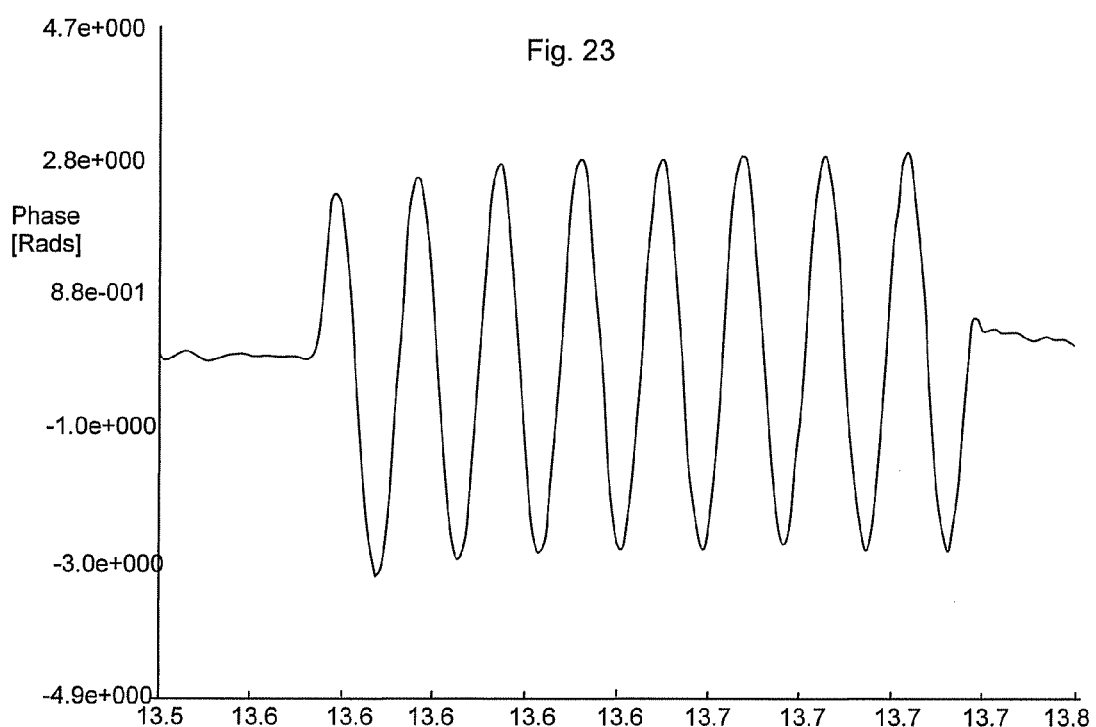
FIG. 23 shows an example of a combined waveform for the analysis bin.

FIGS. 21 to 23 show some processed data from a plurality of diversity samples channels acquired from a distributed acoustic sensor interrogated with pulse pairs of the form shown in FIG. 2. The detector was sampled at 80 MHz to provide diversity channels of 1.25 m spacing and the optical fibre was stimulated with a pulsed modulation. Eight successive diversity channels were grouped together in an analysis bin.

The top plot of FIG. 21 shows the demodulated phase data from each of the channels over time. It can be seen from the raw phase data that several channels show a pulsed phase modulated of about 3 radians amplitude but that other channels show a much less clear signal with a lower amplitude. The lower plot of FIG. 21 shows, for one channel, the calculated similarity metric $M_Q$, for that channel with each of the other channels. It can be seen that for the selected channel there is a relatively high metric score for several of the channels but that the metric for the other channels (which in this case are the ones which are the noisy channels) is low.

FIG. 22 again shows phase data derived for each of the eight diversity channels. FIG. 23 shows the output after processing according to the method described above, i.e. the resulting output phase waveform. It can be seen that the output waveform is a clean waveform that matches the waveform of the majority of channels. The result is therefore a combined phase value for the analysis bin with good signal to noise properties and a much reduced change of fading.

As mentioned above selecting a predetermined number of channels to be combined means that the noise characteristics for each analysis bin may be generally the same and may remain constant over time. However other arrangements are possible—for example a quality metric could be applied to the phase values of each channel to determine the degree of self similarity to other channels and all phase values which are sufficiently similar to one another may be combined. For example the channels may be grouped into sets wherein the metric for each channel combination in the set is above a certain threshold. The largest such set may then be selected for combination.

Thus if, at any time, 8 out ten channels are similar to one another, e.g. score sufficiently highly, these 8 similar channels may be combined but, for another analysis bin (or for the same analysis bin at a different time where thermal fluctuations may have altered the channel properties), if only 4 channels are similar to one another then only those four channels may be combined.

Changing the number of channels used in the combination will affect the noise properties of the system but this could be dealt with by suitable calibration. The processing circuitry may also provide an indication of the number of channels of an analysis bin that were used in performing the combination.

It will also be appreciated that the phase centre of the analysis bin may vary depending on the channels actually selected for combination. For example, if five channels are selected for combination in an analysis bin of ten channels, then if the first five channels are the ones selected the phase centre of the resulting combined sample will be skewed to one side of the analysis bin. The processing circuitry may therefore also be arranged to provide an indication of the relevant channels or at least the spread of channels used in the combination and/or an estimate of phase centre.

The metric discussed above looks for self-similarity of the demodulated phase values of the channels in the analysis bin. This relies on the assumption that each of the various channels is experiencing the same general stimulus. This is a reasonable assumption in most instances but it may not be sufficient for some precision applications or where incident waves with high wavenumber may be expected. In such cases it may be desirable to apply some time adjustment to the phase values of each channel prior to assessment to take into account a direction of arrival of the acoustic stimulus, i.e. to apply some beamforming type techniques.

The embodiments described above use pulse pairs wherein different pulse pairs have different phase encoding in the order to recover a useable phase modulated signal, even within the baseband of the sensor. This avoids the need for very high carrier frequencies and the consequent need for very fast components.

Whilst the embodiments described above described processing each channel to determine a phase and possibly an amplitude value for the demodulated measurement signal the actual amplitude of the backscatter signal itself, i.e. before processing, may also be used as a basic metric. This average intensity may be determined over time and used as an indication of the SNR for that channel. Referring back to FIG. 18 it will be clear that the average intensity depends on the relevant phase bias position that applies for that channel. Samples with an SNR below a certain threshold, i.e. with an average intensity below a certain threshold may be discarded to avoid the need to process those samples, thus saving on processing overhead.

The invention claimed is:

1. A distributed fibre optic sensor apparatus comprising:
   an optical source configured to, in use, launch interrogating radiation into an optical fibre;
   a sampling detector configured to, in use, sample interrogating radiation which is backscattered from within said optical fibre; and
   a processor configured to determine any phase modulation for at least one spatial sensing portion of said optical fibre
   wherein said processor is configured to:
      take a plurality of samples corresponding to radiation backscattered from at least part of a spatial sensing portion of interest following each launch;
      divide said plurality of samples into a plurality of processing channels;
      process at least some of said plurality of processing channels to determine at least phase data for said channels;
      apply a quality metric to said phase data from said processing channels and determine results of applying said quality metric; and
      combine the determined phase data for said channels into an overall phase value for said spatial sensing portion of interest based on the results of applying said quality metric.

2. A distributed fibre optic sensor apparatus as claimed in claim 1 wherein the quality metric comprises a determination as to a degree of similarity between the phase data for a given channel and phase data from the other processed channels.

3. A distributed fibre optic sensor apparatus as claimed in claim 2 wherein the processor is configured to analyse the phase data from said channels to determine whether results from one channel are similar to results from the other channels.

4. A distributed fibre optic sensor apparatus as claimed in claim 3 wherein the processor is configured to determine a score based on how similar the phase data from one channel is to the phase data from another channel.

5. A distributed fibre optic sensor apparatus as claimed in claim 2 wherein the processor is configured to correlate the phase data from one channel with the phase data from the other channels.

6. A distributed fibre optic sensor apparatus as claimed in claim 2 wherein the processor is configured to determine a degree of similarity between the phase data from two channels by determining, for each channel, the degree of variation of current phase value from an average phase value for that channel.

7. A distributed fibre optic sensor apparatus as claimed in claim 6 wherein the processor is configured to determine, for each combination of two channels, a first metric of the form:

$$M1(A,B)=(A-<A>)\cdot(B-<B>),$$

where A and B are current data values from the channel and $<A>$ and $<B>$ are average values of the data from the channels.

8. A distributed fibre optic sensor apparatus as claimed in claim 7 wherein the processor is configured to determine a measurement of a magnitude of a difference between the phase data in two channels by determining, for each combination of two channels a second metric of the form:

$$M2(A,B)=((A-<A>)\cdot(B-<B>))^2.$$

9. A distributed fibre optic sensor apparatus as claimed in claim 8 wherein the processor is configured to determine an overall quality metric for each combination of two channels by determining a difference between said first and second metrics.

10. A distributed fibre optic sensor apparatus as claimed in claim 1 wherein the processor is configured to applying a weighting applied to the phase data from each processing channel based on said quality metric and combine the phase data from the channels to provide said overall phase value according to said weighting.

11. A distributed fibre optic sensor apparatus as claimed in 10 wherein the processor is configured such that phase data from channels which are similar to one another are given higher weightings than processed phase values that are less similar to one another.

12. A distributed fibre optic sensor apparatus as claimed in claim 1 wherein the processor is configured so as to use processed phase data from only a subset of said processing channels to form the overall phase value, wherein the subset comprises those channels for which the quality metric is indicative of a higher quality than the quality of other channels.

13. A distributed fibre optic sensor apparatus as claimed in claim 12 wherein said subset of channels comprises a pre-determined number of channels.

14. A distributed fibre optic sensor apparatus as claimed in claim 13 wherein said pre-determined number of channels is configurable by a user of the apparatus.

15. A distributed fibre optic sensor apparatus as claimed in claim 12 wherein the number of channels comprising said subset is variable based on the phase data of the channels.

16. A distributed fibre optic sensor apparatus as claimed in claim 15 wherein the processor is configured to determine a score for the phase data from each channel based on the quality metric and to use any phase data with a score above a threshold in the combination to produce said overall phase value.

17. A distributed fibre optic sensor apparatus as claimed in claim 15 where the processor is configured to indicate the number of channels of phase data used in the combination to produce said overall phase value.

18. A distributed fibre optic sensor apparatus as claimed in claim 14 where the processor is configured to calibrate the overall phase value based on the number of channels of data used in the combination to produce said overall phase value.

19. A distributed fibre optic sensor apparatus as claimed in claim 15 where the processor is configured to provide an indication of at least one of: specific channels of phase data used to produce said overall phase value and a spread of the channels of phase data used to produce said overall phase value.

20. A distributed fibre optic sensor apparatus as claimed in claim 15 where the processor is configured to provide an estimate of a phase centre of the sensing portion of interest based on the channels of phase data used to produce said overall phase value.

21. A distributed fibre optic sensor apparatus as claimed in claim 1 wherein the processor is configured to apply a time adjustment to a phase values of each channel to take into account a direction of arrival of an acoustic stimulus prior to applying the quality metric.

22. A distributed fibre optic sensor apparatus as claimed in claim 1 wherein the processor is configured to determine phase data and amplitude data for each processing channel.

23. A distributed fibre optic sensor apparatus as claimed in claim 22 wherein applying said quality metric comprises determining an AC to DC ratio of the amplitude data from each channel.

24. A distributed fibre optic sensor apparatus as claimed in claim 23 wherein said AC to DC ratio is used as an indication of signal to noise ratio for that channel.

25. A distributed fibre optic sensor apparatus as claimed in claim 23 wherein the processor is configured to discard any phase values from channels with an AC to DC ratio value below a predetermined threshold.

26. A distributed fibre optic sensor apparatus as claimed in claim 23 wherein the processor is configured to apply a weighting to the phase data from each channel based on said AC to DC ratio for that channel and to form the overall phase value taking said weighting into account.

27. A distributed fibre optic sensor apparatus as claimed in claim 1 wherein the processor is configured such that each channel of said plurality of channels is processed to determine a phase value.

28. A distributed fibre optic sensor apparatus as claimed in claim 1 wherein the processor is configured to estimate a signal to noise ratio for a channel and only process data in that channel to determine phase data if the signal to noise ratio is above a certain threshold.

29. A distributed fibre optic sensor apparatus as claimed in claim 28 wherein the processor is configured to use an average intensity of the diversity samples in each channel as an estimate of signal to noise ratio.

30. A distributed fibre optic sensor apparatus as claimed in claim 1 wherein a majority of the plurality of samples corresponding to the sensing portion of interest are substantially independent diversity samples.

31. A distributed fibre optic sensor apparatus as claimed in claim 1 wherein, in use, said plurality of samples are acquired such that, for each sample, each contributing section of optical fibre from which a backscatter signal could be received at the detector from a pulse of interrogating radiation is substantially independent of the corresponding contributing section of a majority of the rest of the plurality of samples.

32. A distributed fibre optic sensor apparatus as claimed in claim 31 wherein, in use, said plurality of samples are acquired such that, for each sample, each said contributing section is substantially independent of the corresponding contributing sections of 75% or more of the rest of the plurality of samples.

33. A distributed fibre optic sensor apparatus as claimed in claim 31 wherein a degree of overlap between each said contributing section of optical fibre for one sample compared with the corresponding contributing section for any other sample within the plurality of samples is 50% or less.

34. A distributed fibre optic sensor apparatus as claimed in claim 31 wherein a degree of overlap between each said contributing section of optical fibre for one sample compared with the corresponding contributing section for any other sample within the plurality of samples is 25% or less.

35. A distributed fibre optic sensor apparatus as claimed in claim 31 wherein each sample is such that each said contributing section is substantially independent of the corresponding contributing section for all of the rest of said plurality of samples.

36. A distributed fibre optic sensor apparatus as claimed in claim 31 wherein the optical source is configured such that the interrogating radiation comprises at least a first pulse having a first pulse duration and the sampling detector is configured such that time difference between samples is greater than the first pulse duration for a majority of the plurality of samples.

37. A distributed fibre optic sensor apparatus as claimed in claim 36 the sampling detector is configured such that time difference between any two samples in said plurality of samples is at least 50% of the first pulse duration.

38. A distributed fibre optic sensor apparatus as claimed in claim 36 the sampling detector is configured such that time difference between any two samples in said plurality of samples is at least 75% of the first pulse duration.

39. A distributed fibre optic sensor apparatus as claimed in claim 36 the sampling detector is configured such that time difference between any two samples in said plurality of samples is at least equal to the first pulse duration.

40. A distributed fibre optic sensor apparatus as claimed in claim 1 wherein a sampling rate of the detector is such that a series of successive samples can be used directly as the plurality of samples corresponding to a sensing portion of interest.

41. A distributed fibre optic sensor apparatus as claimed in claim 1 wherein a sampling rate of the detector is configured to acquire a plurality of samples in the time taken for the interrogating radiation to travel in the fibre a distance equal to twice the length of the sensing portion of interest.

42. A distributed fibre optic sensor apparatus as claimed in claim 1 wherein a sampling rate of the detector is of an order of 100 MHz or more.

43. A distributed fibre optic sensor apparatus as claimed in claim 1 wherein the optical source is configured such that the interrogating radiation comprises a first pulse and a second pulse with a gap between them.

44. A distributed fibre optic sensor apparatus as claimed in claim 43 wherein the duration between the first and second pulses is equal to or greater than the pulse duration of the first pulse and/or second pulse.

45. A distributed fibre optic sensor apparatus as claimed in claim 44 wherein the duration between the first and second pulses is at least twice the pulse duration of the first pulse and/or second pulse.

46. A distributed fibre optic sensor apparatus as claimed in claim 43 wherein the optical source is configured such that the pulses of the pulse pair have a frequency difference between them.

47. A distributed fibre optic sensor apparatus as claimed in claim 1 wherein the optical source is configured to repeatedly launch pulse pairs into the optical fibre wherein the pulses pairs in successive launches have a common frequency configuration as one another and are generated such that a phase relationship of the pulses of one pulse pair has a predetermined relative phase difference to a phase relationship of a successive pulse pair.

48. A method of distributed fibre optic sensing comprising:
   launching interrogating radiation into an optical fibre;
   sampling interrogating radiation which is backscattered from within said optical fibre; and
   determining any phase modulation for at least one spatial sensing portion of said optical fibre wherein the step of determining any phase modulation comprises:
      taking a plurality of samples corresponding to radiation backscattered from at least part of a spatial sensing portion of interest following each launch;
      dividing said plurality of samples into a plurality of processing channels; processing at least some of said plurality of processing channels to determine phase data for said channels;
      applying a quality metric to said phase data from said processing channels and determining results of applying said quality metric; and
      combining the determined phase data for said channels into an overall phase value for said spatial sensing portion of interest based on the results of applying said quality metric.

49. A method as claimed in claim 48 wherein the step of applying the quality metric comprises determining a degree of similarity between the phase data for a given channel and phase data from the other processed channels.

50. A method as claimed in claim 49 wherein the degree of similarity between the phase data from the channels is determined by correlating the phase data from each channel with the phase data from the other channels.

51. A method as claimed in claim 48 wherein phase data from said channels is combined with a weighting applied to the phase data of each processed channel based on the results of applying the quality metric.

52. A method as claimed in claim 48 wherein the phase values from only a subset of the channels are selected, based on said quality metric, to form the combined phase value.

53. A method as claimed in claim 48 wherein a majority of the plurality of samples corresponding to the sensing portion of interest are substantially independent diversity samples.

54. A method as claimed in claim 53 comprising launching interrogating radiation and sampling the detected backscattered radiation such that, for each sample, each contributing section of optical fibre from which a backscatter signal could be received from a pulse of interrogating radiation is substantially independent of the corresponding contributing section of a majority of the rest of the plurality of samples.

55. A method of processing data acquired from a distributed fibre optic sensor to determine any phase modulation comprising the steps of:
   taking a plurality of samples corresponding to radiation backscattered from at least part of a spatial sensing portion of interest of an optical fibre following launch of interrogating radiation into said optical fibre;
   dividing said plurality of samples into a plurality of processing channels;
   processing at least some of said plurality of processing channels to determine phase data for said channels;
   applying a quality metric to said phase data from said processing channels and determining results of applying said quality metric; and
   combining the determined phase data for said channels into a phase value for said spatial sensing portion of interest based on the results of applying said quality metric.

* * * * *

UNITED STATES PATENT AND TRADEMARK OFFICE
CERTIFICATE OF CORRECTION

PATENT NO. : 9,435,668 B2  
APPLICATION NO. : 13/441798  
DATED : September 6, 2016  
INVENTOR(S) : Lewis et al.

Page 1 of 1

It is certified that error appears in the above-identified patent and that said Letters Patent is hereby corrected as shown below:

In the Claims

Claim 10, Column 38, Line 26, delete "applying" and replace with "apply"

Claim 10, Column 38, Line 27, delete "applied" after the term "weighting"

Claim 11, Column 38, Line 32, insert --claim-- before "10"

Claim 21, Column 39, Line 12, delete "values" and replace with "value"

Claim 37, Column 40, Line 22, insert --wherein-- before the term "the sampling detector"

Claim 38, Column 40, Line 26, insert --wherein-- before the term "the sampling detector"

Claim 39, Column 40, Line 39, insert --wherein-- before the term "the sampling detector"

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*